United States Patent
Ikai et al.

(10) Patent No.: US 12,375,718 B2
(45) Date of Patent: Jul. 29, 2025

(54) IMAGE DECODING APPARATUS

(71) Applicant: Sharp Kabushiki Kaisha, Sakai (JP)

(72) Inventors: Tomohiro Ikai, Sakai (JP); Tomonori Hashimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 224 days.

(21) Appl. No.: 17/614,649

(22) PCT Filed: May 29, 2020

(86) PCT No.: PCT/JP2020/021432
§ 371 (c)(1),
(2) Date: Nov. 29, 2021

(87) PCT Pub. No.: WO2020/241858
PCT Pub. Date: Dec. 3, 2020

(65) Prior Publication Data
US 2022/0232255 A1   Jul. 21, 2022

(30) Foreign Application Priority Data
May 30, 2019 (JP) .................. 2019-101179

(51) Int. Cl.
*H04N 19/96* (2014.01)
*H04N 19/11* (2014.01)
(Continued)

(52) U.S. Cl.
CPC ............. *H04N 19/61* (2014.11); *H04N 19/11* (2014.11); *H04N 19/122* (2014.11);
(Continued)

(58) Field of Classification Search
CPC ...... H04N 19/61; H04N 19/11; H04N 19/122; H04N 19/159; H04N 19/176; H04N 19/18;
(Continued)

(56) References Cited

U.S. PATENT DOCUMENTS 5,491,515 A * 2/1996 Suzuki ................. H04N 19/423
348/401.1
6,028,967 A * 2/2000 Kim ....................... H04N 19/48
382/268
(Continued)

FOREIGN PATENT DOCUMENTS

CA   3005463 A1 * 8/2017 ......... G10L 21/0216

OTHER PUBLICATIONS

Benjamin Bross, VVC Draft 5 (Year: 2019).*
(Continued)

*Primary Examiner* — Philip P. Dang
(74) *Attorney, Agent, or Firm* — Keating & Bennett, LLP

(57) ABSTRACT

There is a problem in that implicit MTS performance is lost in a case that the implict MTS is combined with secondary transform. The present invention provides an image decoding apparatus that can more preferably apply transform by MTS and secondary transform. A video decoding apparatus includes: a second transformer configured to apply transform using a transform matrix to the transform coefficient to modify the transform coefficient in a case that secondary transform is enabled; a first transformer configured to apply separate transform including vertical transform and horizontal transform to the transform coefficient; and an implicit transform configuration unit configured to disable implicit transform in a case that the secondary transform is enabled, an intra subpartition mode is not used, and subblock transform is not used, and configured to derive a horizontal (Continued)

transform type according to a width of a target TU and derive a vertical transform type according to a height of the target TU in a case that the implicit transform is enabled. The first transformer performs transform according to the vertical transform type, and transform according to the horizontal transform type.

1 Claim, 24 Drawing Sheets

(51) Int. Cl.
H04N 19/122 (2014.01)
H04N 19/159 (2014.01)
H04N 19/176 (2014.01)
H04N 19/18 (2014.01)
H04N 19/61 (2014.01)

(52) U.S. Cl.
CPC ......... H04N 19/159 (2014.11); H04N 19/176 (2014.11); H04N 19/18 (2014.11)

(58) Field of Classification Search
CPC .. H04N 19/105; H04N 19/119; H04N 19/136; H04N 19/157; H04N 19/12; H04N 19/70
See application file for complete search history.

(56) References Cited

U.S. PATENT DOCUMENTS

| | | | | |
|---|---|---|---|---|
| 6,263,021 B1* | 7/2001 | Sethuraman | | H04N 19/61 |
| | | | | 375/E7.242 |
| 6,295,320 B1* | 9/2001 | Lim | | H04N 21/426 |
| | | | | 375/E7.184 |
| 6,456,658 B2* | 9/2002 | Kamikura | | H04N 19/105 |
| | | | | 375/E7.133 |
| 6,577,251 B1* | 6/2003 | Yip | | H04N 19/61 |
| | | | | 341/61 |
| 6,934,331 B2* | 8/2005 | Kamikura | | H04N 19/105 |
| | | | | 375/E7.211 |
| 7,239,755 B1* | 7/2007 | Kim | | H04N 19/182 |
| | | | | 382/268 |
| 7,720,299 B2* | 5/2010 | Hou | | G06F 17/147 |
| | | | | 382/250 |
| 7,860,160 B2* | 12/2010 | Shimazaki | | H04N 19/61 |
| | | | | 375/240.03 |
| 7,900,124 B2* | 3/2011 | Conway | | G11B 20/10287 |
| | | | | 714/795 |
| 8,462,853 B2* | 6/2013 | Jeon | | H04N 19/52 |
| | | | | 375/240.12 |
| 8,467,619 B2* | 6/2013 | Yoshida | | H04N 19/34 |
| | | | | 382/248 |
| 9,177,562 B2* | 11/2015 | Jeong | | G10L 19/00 |
| 9,496,886 B2* | 11/2016 | Chang | | H04J 14/0227 |
| 9,661,338 B2* | 5/2017 | Karczewicz | | H04N 19/176 |
| 9,813,715 B2* | 11/2017 | Rosewarne | | H04N 19/98 |
| 9,998,746 B2* | 6/2018 | Wu | | H04N 19/61 |
| 10,356,413 B1* | 7/2019 | Sim | | H04N 19/197 |
| 10,390,044 B2* | 8/2019 | Karczewicz | | H04N 19/61 |
| 10,405,000 B2* | 9/2019 | Kao | | H04N 19/129 |
| 10,491,922 B2* | 11/2019 | Zhao | | H04N 19/18 |
| 10,520,916 B1* | 12/2019 | Gros | | G05B 13/042 |
| 10,887,626 B2* | 1/2021 | Ikai | | H04N 19/96 |
| 11,025,907 B2* | 6/2021 | Li | | H04N 19/119 |
| 2002/0196849 A1* | 12/2002 | Kamikura | | H04N 19/46 |
| | | | | 375/E7.172 |
| 2005/0084011 A1* | 4/2005 | Song | | H04N 19/117 |
| | | | | 375/E7.161 |
| 2005/0111543 A1* | 5/2005 | Seo | | H04N 19/36 |
| | | | | 375/240.2 |
| 2005/0281332 A1* | 12/2005 | Lai | | H04N 19/436 |
| | | | | 375/240.18 |
| 2008/0071846 A1* | 3/2008 | Sadafale | | H03H 17/0416 |
| | | | | 708/313 |
| 2009/0222261 A1* | 9/2009 | Jung | | G10L 19/24 |
| | | | | 704/219 |
| 2010/0177819 A1* | 7/2010 | Jeon | | H04N 19/61 |
| | | | | 375/240.2 |
| 2011/0116539 A1* | 5/2011 | He | | G06F 17/147 |
| | | | | 375/240.2 |
| 2014/0133546 A1* | 5/2014 | Bandoh | | H04N 19/15 |
| | | | | 375/240.02 |
| 2019/0246142 A1* | 8/2019 | Zhao | | H04N 19/132 |
| 2019/0313126 A1* | 10/2019 | Lin | | H04N 19/615 |
| 2020/0213626 A1* | 7/2020 | Ikai | | H04N 19/176 |

OTHER PUBLICATIONS

Ankur Saxena, on Secondary Transforms for Intra Prediction Residual, IEEE (Year: 2012).*
Lu et al., "CE12: Mapping functions (test CE12-1 and CE12-2)", Joint Video Experts Team (JVET) of ITU-T SG 16 WP 3 and ISO/IEC JTC 1/SC 29/WG 11, JVET-M0427-v2, Jan. 9-18, 2019, pp. 1-13.
Bross et al., "Versatile Video Coding (Draft 5)", Joint Video Experts Team (JVET) of ITU-T SG 16 WP 3 and ISO/IEC JTC 1/SC 29/WG 11, JVET-N1001-v6, Mar. 19-27, 2019, 382 pages.
Zhao et al., "Non-CE6: Harmonization of LFNST, MIP and implicit MTS", Joint Video Experts Team (JVET) of ITU-T SG 16 WP 3 and ISO/IEC JTC 1/SC 29/WG 11, JVET-O0540, Jul. 3-12, 2019, pp. 1-4.
Ikai, "Non CE6: Harmonization of implicit MTS and LFNST", Joint Video Experts Team (JVET) of ITU-T SG 16 WP 3 and ISO/IEC JTC 1/SC 29/WG 11, JVET-O0214, Jul. 3-12, 2019, pp. 1-3.
Naser, "CE6-Related: NSST with 8 Coefficients Computation-Spec_text-test1", JVET-N0509, Mar. 22, 2019, 15 pages.

* cited by examiner

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1 : 0 | ( nTbH >= 4 && nTbH <= 16 ) ? 1 : 0 |
| INTRA_ANGULAR33, INTRA_ANGULAR35 | 0 | 0 |
| INTRA_ANGULAR2, INTRA_ANGULAR4,...,INTRA_ANGULAR28, INTRA_ANGULAR30, INTRA_ANGULAR39, INTRA_ANGULAR41,...,INTRA_ANGULAR63, INTRA_ANGULAR65 | ( nTbW >= 4 && nTbW <= 16 ) ? 1 : 0 | 0 |
| INTRA_ANGULAR3, INTRA_ANGULAR5,..., INTRA_ANGULAR27, INTRA_ANGULAR29, INTRA_ANGULAR38, INTRA_ANGULAR40,...,INTRA_ANGULAR64, INTRA_ANGULAR66 | 0 | ( nTbH >= 4 && nTbH <= 16 ) ? 1 : 0 |

FIG. 14

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

FIG. 15

IMAGE DECODING APPARATUS

CROSS-REFERENCE OF RELATED APPLICATION

This application claims the benefit of priority to JP 2019-101179 filed on May 30, 2019, which is incorporated herein by reference in its entirety.

TECHNICAL FIELD

Embodiments of the present invention relate to an image decoding apparatus and an image coding apparatus.

BACKGROUND ART

An image coding apparatus which generates coded data by coding an image, and an image decoding apparatus which generates decoded images by decoding the coded data are used for efficient transmission or recording of images.

Specific image coding schemes include, for example, H.264/AVC and High-Efficiency Video Coding (HEVC), and the like.

In such an image coding scheme, images (pictures) constituting an image are managed in a hierarchical structure including slices obtained by splitting an image, coding tree units (CTUs) obtained by splitting a slice, units of coding (coding units; which will be referred to as CUs) obtained by splitting a coding tree unit, and transform units (TUs) obtained by splitting a coding unit, and are coded/decoded for each CU.

In such an image coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

As a technique of image coding and decoding of recent years, NPL 1 and NPL 2 are given. NPL 1 discloses a technique referred to as Multiple Transform Selection (MTS) that switches a transform matrix according to explicit syntax in coded data or an implicit block size. NPL 2 discloses an image coding apparatus that transforms each transformed coefficient of a prediction error for each transform unit by using RST (Reduced Secondary Transform) transform, that is, secondary transform, and thereby derives a transform coefficient. NPL 2 further discloses an image decoding apparatus that inversely transforms a transform coefficient for each transform unit by using secondary transform.

CITATION LIST

Non Patent Literature

NPL 1: "Versatile Video Coding (Draft 5)", JVET-N1001-v6, Joint Video Exploration Team (JVET) of ITU-T SG 16 WP 3 and ISO/IEC JTC 1/SC 29/WG 11, 2019 May 23

NPL 2: "CE12: Mapping functions (test CE12-1 and CE12-2)", JVET-M0427-v2, Joint Video Experts Team (JVET) of ITU-T SG 16 WP 3 and ISO/IEC JTC 1/SC 29/WG 11 13th Meeting: Marrakech, Mass., 9-18 Jan. 2019

SUMMARY OF INVENTION

Technical Problem

In the secondary transform as in NPL 1 and techniques related to the secondary transform, there is a problem that performance of a case that the secondary transform and transform by MTS are combined is not sufficient. In particular, there is a problem that performance of implicit MTS is lost in a case of being combined with the secondary transform.

The present invention has an object to provide an image decoding apparatus that can more preferably apply transform by MTS and secondary transform and its related technologies.

Solution to Problem

A video decoding apparatus according to an aspect of the present invention is an image decoding apparatus for transforming a transform coefficient for each transform unit, the image decoding apparatus including: a second transformer configured to apply transform using a transform matrix to the transform coefficient to modify the transform coefficient in a case that secondary transform is enabled; a first transformer configured to apply separate transform including vertical transform and horizontal transform to the transform coefficient; and an implicit transform configuration unit configured to disable implicit transform in a case that the secondary transform is enabled, an intra subpartition mode is not used, and subblock transform is not used, and configured to derive a horizontal transform type according to a width of a target TU and derive a vertical transform type according to a height of the target TU in a case that the implicit transform is enabled. The first transformer performs transform according to the vertical transform type, and transform according to the horizontal transform type.

BRIEF DESCRIPTION OF DRAWINGS

FIG. 14 is a diagram illustrating operation of implicit MTS in a case that an intra subpartition mode (intra subpartition prediction) is used.

FIG. 15 is a diagram illustrating operation of implicit MTS of a case that subblock transform is used.

DESCRIPTION OF EMBODIMENTS

Embodiment 1

Hereinafter, an embodiment of the present invention will be described with reference to the drawings.

Figure 1:
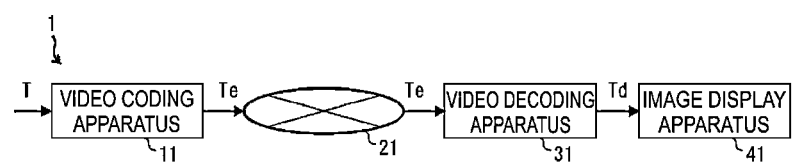
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and an image display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. Furthermore, the network 21 may be substituted by a storage medium in which the coding stream Te is recorded, such as a Digital Versatile Disc (DVD: trade name) or a Blue-ray Disc (BD: trade name).

The video decoding apparatus 31 decodes each of the coding streams Te transmitted from the network 21 and generates one or multiple decoded images Td.

The image display apparatus 41 displays all or part of one or multiple decoded images Td generated by the video decoding apparatus 31. For example, the image display apparatus 41 includes a display device such as a liquid crystal display and an organic Electro-Luminescence (EL) display. Forms of the display include a stationary type, a mobile type, an HMD type, and the like. In addition, in a case that the video decoding apparatus 31 has a high processing capability, an image having high image quality is displayed, and in a case that the apparatus has a lower processing capability, an image which does not require high processing capability and display capability is displayed.

Operator

Operators used in the present specification will be described below.

>> is a right bit shift, << is a left bit shift, & is a bitwise AND, | is a bitwise OR, |= is an OR assignment operator, and || indicates a logical sum.

x ? y : z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
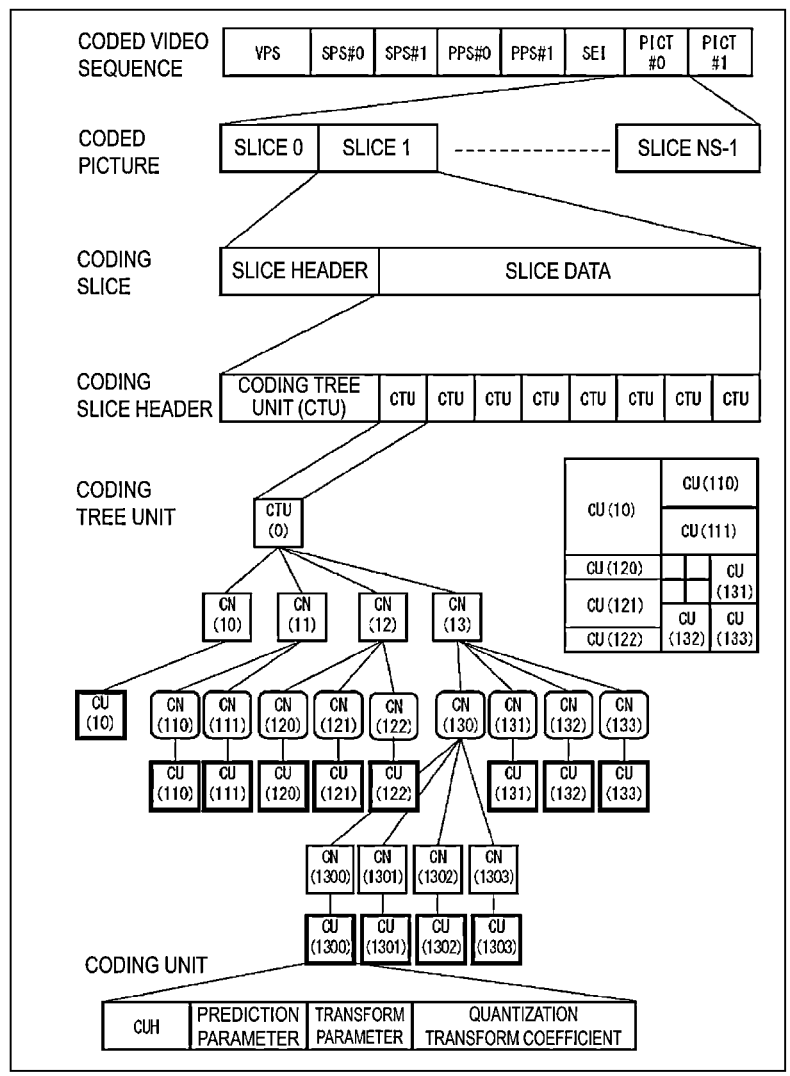
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. FIG. 4 illustrates diagrams illustrating a coded video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit, respectively.

Coded Video Sequence

In the coded video sequence, a set of data referred to by the video decoding apparatus 31 to decode the sequence SEQ to be processed is defined. As illustrated in the coding video sequence of FIG. 4, the sequence SEQ includes a Video Parameter Set, a Sequence Parameter Set SPS, a Picture Parameter Set PPS, a picture PICT, and Supplemental Enhancement Information SEI.

In the video parameter set VPS, in an image including multiple layers, a set of coding parameters common to multiple images and a set of coding parameters associated with the multiple layers and an individual layer included in the image are defined.

In the sequence parameter set SPS, a set of coding parameters referred to by the video decoding apparatus 31 to decode a target sequence is defined. For example, a width and a height of a picture are defined. Note that multiple SPSs may exist. In that case, any of the multiple SPSs is selected from the PPS.

In the picture parameter set PPS, a set of coding parameters referred to by the video decoding apparatus 31 to decode each picture in a target sequence is defined. For example, a reference value (pic_init_qp_minus26) of a quantization step size used for decoding of a picture, a flag (weighted_pred_flag) indicating an application of a weight prediction, and a scaling list (quantization matrix) are included. Note that multiple PPSs may exist. In that case, any of the multiple PPSs is selected from each picture in a target sequence.

Coded Picture

In the coded picture, a set of data referred to by the video decoding apparatus 31 to decode the picture PICT to be processed is defined. As illustrated in the coding picture of FIG. 4, the picture PICT includes a slice 0 to a slice NS−1 (NS is the total number of slices included in the picture PICT).

Note that in a case that it is not necessary to distinguish each of the slice 0 to the slice NS−1 below, subscripts of reference signs may be omitted. In addition, the same applies to other data with subscripts included in the coding stream Te which will be described below.

Coding Slice

In the coding slice, a set of data referred to by the video decoding apparatus 31 to decode the slice S to be processed is defined. As illustrated in the coding slice of FIG. 4, the slice includes a slice header and slice data.

The slice header includes a coding parameter group referred to by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referred to by the video decoding apparatus 31 to decode the slice data to be processed is defined. As illustrated in the coding slice header of FIG. 4, the slice data includes a CTU. The CTU is a block of a fixed size (for example, 64×64) constituting a slice, and may be called a Largest Coding Unit (LCU).

Coding Tree Unit

In the coding tree unit of FIG. 4, a set of data referred to by the video decoding apparatus 31 to decode the CTU to be processed is defined. The CTU is split into coding unit CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

The CT includes, as CT information, a QT split flag (cu_split_flag) indicating whether or not to perform a QT split, an MT split flag (split_mt_flag) indicating the presence or absence of an MT split, an MT split direction (split_mt_dir) indicating a split direction of an MT split, and an MT split type (split_mt_type) indicating a split type of an MT split. cu_split_flag, split_mt_flag, split_mt_dir, and split_mt_type are transmitted for each coding node.

Figure 5:
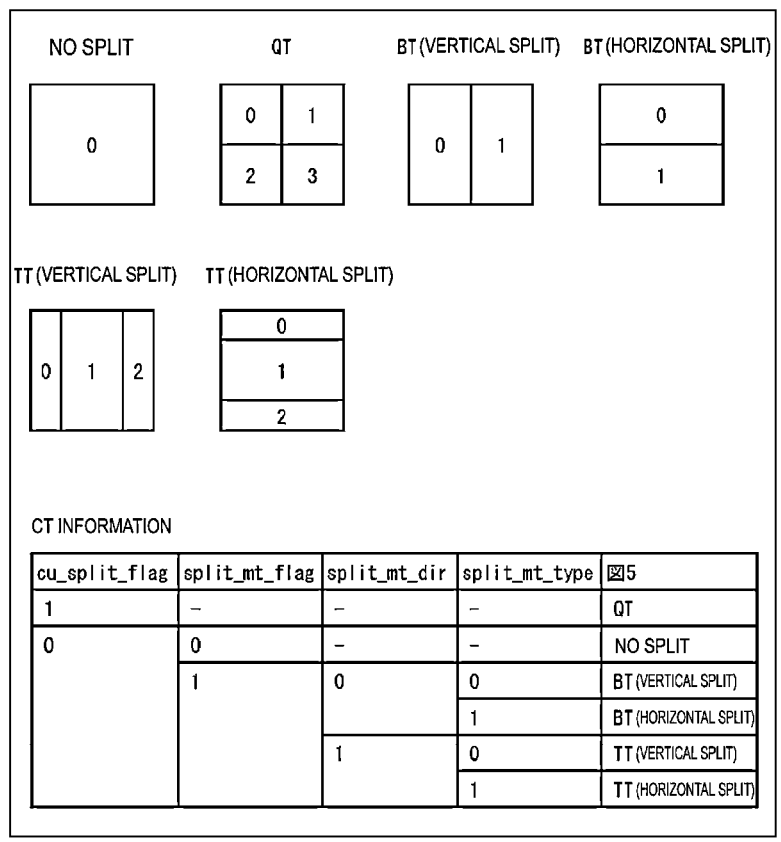
FIG. 5 is a diagram illustrating a split example of a CTU.

In a case that cu_split_flag is 1, the coding node is split into four coding nodes (QT of FIG. 5).

In a case that cu_split_flag is 0, the coding node is not split and has one CU as a node in a case that split_mt_flag is 0 (no split of FIG. 5(a)). The CU is an end node of the coding nodes and is not split any further. The CU is a basic unit of coding processing.

In a case that split_mt_flag is 1, the coding node is subjected to the MT split as described below. In a case that split_mt_type is 0, in a case that split_mt_dir is 1, the coding node is horizontally split into two coding nodes (BT (horizontal split) of FIG. 5), and in a case that split_mt_dir is 0, the coding node is vertically split into two coding nodes (BT (vertical split) of FIG. 5). Further, in a case that split_mt_type is 1, in a case that split_mt_dir is 1, the coding node is horizontally split into three coding nodes (TT (horizontal split) of FIG. 5), and in a case that split_mt_dir is 0, the coding node is vertically split into three coding nodes (TT (vertical split) of FIG. 5). These are illustrated in the CT information of FIG. 5.

Furthermore, in a case that a size of the CTU is 64×64 pixels, a size of the CU may take any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in the coding unit of FIG. 4, a set of data referred to by the video decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

There are cases that the prediction processing is performed in units of CU or performed in units of sub-CU in which the CU is further split. In a case that the sizes of the CU and the sub-CU are equal to each other, the number of sub-CUs in the CU is one. In a case that the CU is larger in size than the sub-CU, the CU is split into sub-CUs. For example, in a case that the CU has a size of 8×8, and the sub-CU has a size of 4×4, the CU is split into four sub-CUs which include two horizontal splits and two vertical splits.

There are two types of predictions (prediction modes), which are intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in units of CU, but the quantization transform coefficient may be subjected to entropy coding in units of sub-block such as 4×4.

Prediction Parameter

A prediction image is derived by a prediction parameter accompanying a block. The prediction parameter includes prediction parameters of the intra prediction and the inter prediction.

Figure 6:
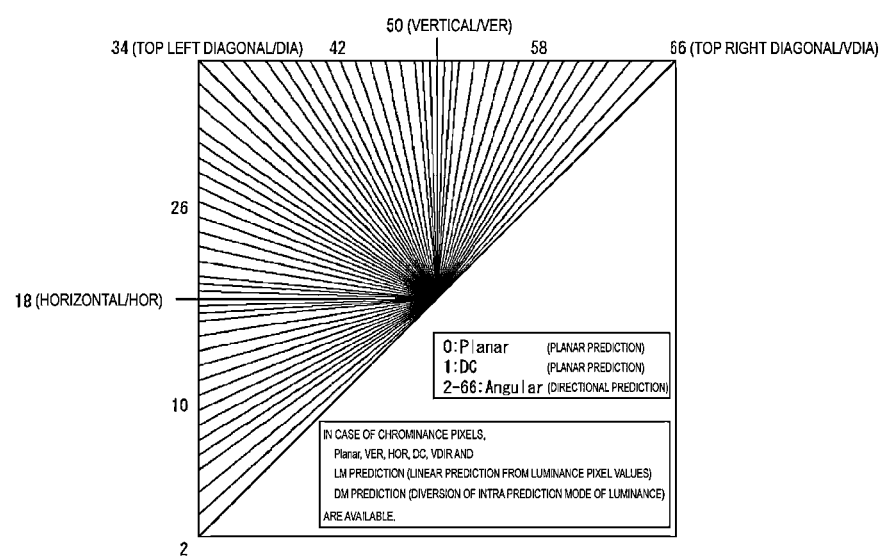
FIG. 6 is a schematic diagram illustrating types (mode numbers) of an intra prediction mode.

The prediction parameters of the intra prediction will be described below. The intra prediction parameters include a luminance prediction mode IntraPredModeY and a chrominance prediction mode IntraPredModeC. FIG. 6 is a schematic diagram illustrating types (mode numbers) of an intra prediction mode. As illustrated in FIG. 6, the intra prediction mode includes, for example, 67 types (0 to 66). For example, there are planar prediction (0), DC prediction (1), and Angular prediction (2 to 66). In addition, in chrominance, an LM mode (67 to 72) may be added.

The syntax elements for deriving the intra prediction parameters include, for example, intra_luma_mpm_flag, intra_luma_mpm_idx, intra_luma_mpm_remainder, and the like.
MPM intra_luma_mpm_flag is a flag indicating whether IntraPredModeY of the target block and the Most Probable Mode (MPM) match each other. The MPM is a prediction mode included in an MPM candidate list mpmCandList[ ]. The MPM candidate list is a list that stores candidates that are inferred to have high probability of being applied to the target block, based on the intra prediction mode of a neighboring block and a prescribed intra prediction mode. In a case that intra_luma_mpm_flag is 1, IntraPredModeY of the target block is derived by using the MPM candidate list and the index intra_luma_mpm_idx.

$$IntraPredModeY = mpmCandList[\text{intra\_luma\_mpm\_idx}]$$

REM

In a case that intra_luma_mpm_flag is 0, the intra prediction mode is selected from remaining modes RemIntraPredMode, which are obtained by removing the intra prediction mode included in the MPM candidate list from all of the intra prediction modes. The intra prediction mode which is selectable as RemIntraPredMode is referred to as "non-MPM" or "REM". RemIntraPredMode is derived using intra_luma_mpm_remainder.

Configuration of Video Decoding Apparatus

Figure 7:
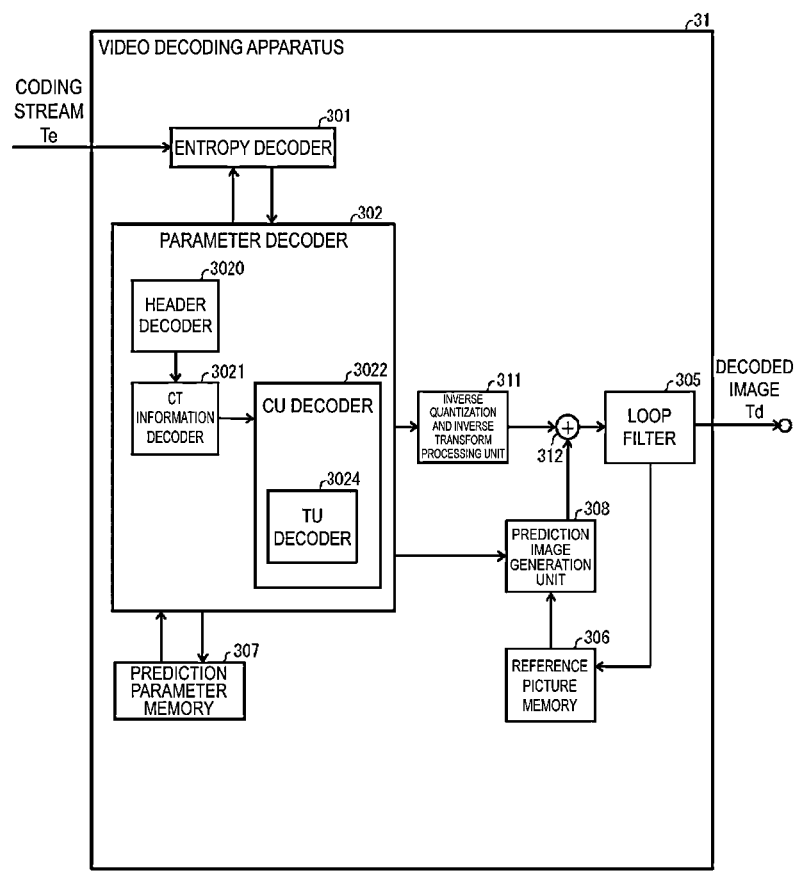
FIG. 7 is a schematic diagram illustrating a configuration of a video decoding apparatus.

The configuration of the video decoding apparatus 31 (FIG. 7) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312. Note that a configuration in which the loop filter 305 is not included in the video decoding apparatus 31 may be used in accordance with the video coding apparatus 11 described later.

The parameter decoder 302 further includes a header decoder 3020, a CT information decoder 3021, and a CU decoder 3022 (prediction mode decoder), and the CU decoder 3022 includes a TU decoder 3024. These may be collectively referred to as a decoding module. The header decoder 3020 decodes, from coded data, parameter set information such as the VPS, the SPS, and the PPS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and quantization prediction error (residual_coding) from coded data.

Figure 23:
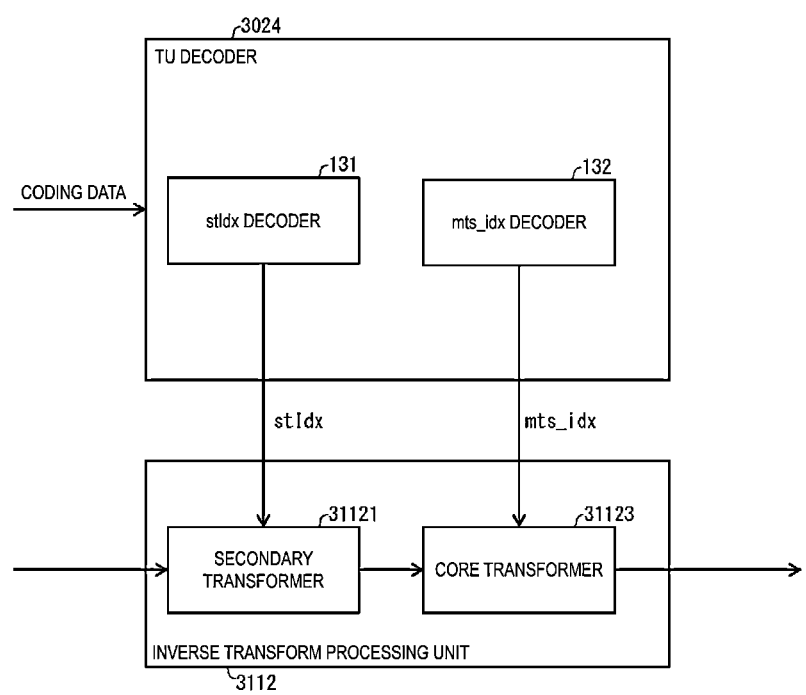
FIG. 23 is a block diagram illustrating a relationship between a TU decoder and an inverse transform processing unit.

FIG. 23 is a block diagram illustrating a relationship between the TU decoder 3024 and an inverse transform processing unit 3112. An stIdx decoder 131 of the TU decoder 3024 decodes, from coded data, a value stIdx indicating whether or not secondary transform is used and a transform basis, and outputs the value stIdx to a secondary transformer 31121. An mts_idx decoder 132 of the TU decoder 3024 decodes, from coded data, a value mts_idx indicating a transform matrix of MTS, and outputs the value mts_idx to the core transformer 31123. Specifically, the TU decoder 3024 decodes stIdx in a case that the width and the height of the CU are 4 or greater, the prediction mode is the intra mode, and the number numSigCoeff of transform coefficients in the CU is larger than a prescribed number THSt (for example, 2 in a case of SINGLE_TREE, 1 in other cases). Note that, in a case that stIdx is 0, secondary transform is not applied, in a case that stIdx is 1, one transform of a set (pair) of secondary transformation matrices is indicated, and in a case that stIdx is 2, the other transform of the pair is indicated. The secondary transform matrix secTransMatrix may be selected according to not only the value of stIdx but also the intra prediction mode and the size of transform.

The parameter decoder 302 includes an inter prediction parameter decoder 303 and an intra prediction parameter decoder 304 (not illustrated). The prediction image generation unit 308 includes an inter prediction image generation unit 309 and an intra prediction image generation unit 310.

Furthermore, an example in which a CTU and a CU are used as units of processing is described below, but the processing is not limited to this example, and processing in units of sub-CU may be performed. Alternatively, the CTU and the CU may be replaced with a block, the sub-CU may be replaced with by a sub-block, and processing may be performed in units of blocks or sub-blocks.

The entropy decoder 301 performs entropy decoding on the coding stream Te input from the outside and separates and decodes individual codes (syntax elements). The entropy coding includes a scheme in which syntax elements are subjected to variable length coding by using a context (probability model) that is adaptively selected according to a type of the syntax elements and a surrounding condition, and a scheme in which syntax elements are subjected to variable length coding by using a table or a calculation expression that is determined in advance. In the former Context Adaptive Binary Arithmetic Coding (CABAC), probability models updated for each coded or decoded picture (slice) are stored in memory. Then, as the initial state of the context of a P picture or a B picture, the probability model of a picture using the same slice type and the same slice level quantization parameter is configured out of the probability models stored in the memory. The initial state is used for coding and decoding processing. The separated codes include prediction information to generate a prediction image, a prediction error to generate a difference image, and the like.

The entropy decoder 301 outputs the separated codes to the parameter decoder 302. The separated codes are, for example, a prediction mode predMode. Which code is to be decoded is controlled based on an indication of the parameter decoder 302.

Basic Flow of Operation

Figure 8:
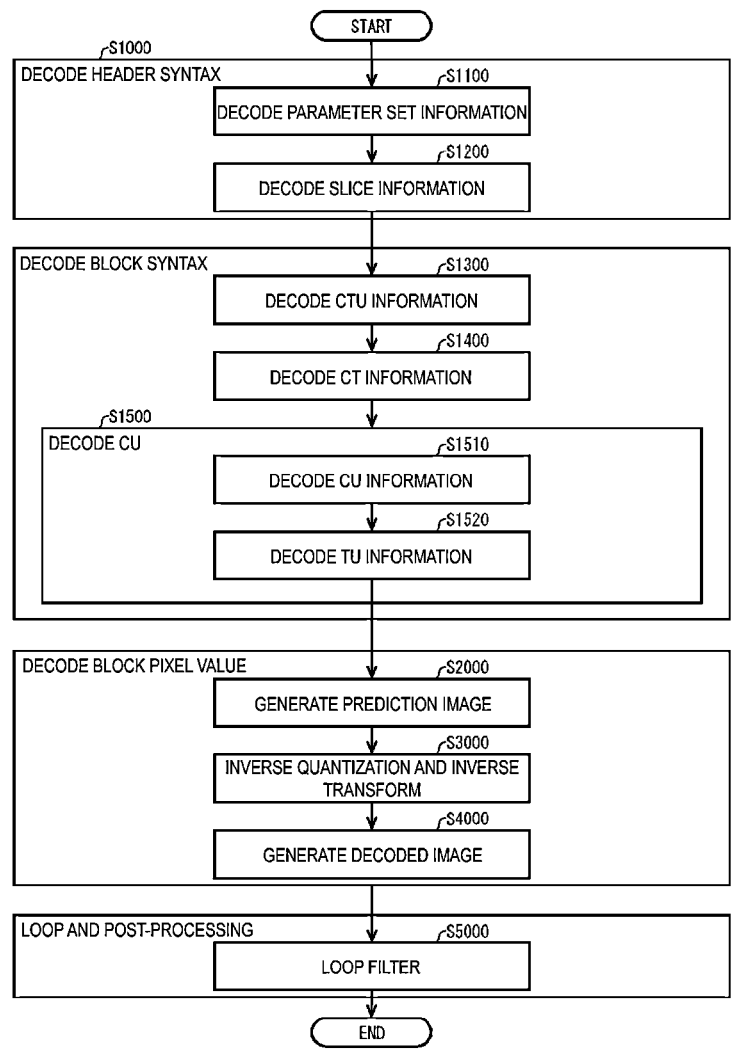
FIG. 8 is a flowchart illustrating general operation of the video decoding apparatus.

FIG. 8 is a flowchart for describing general operation performed in the video decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes, for example, CU information, prediction information, a TU split flag split_transform_flag, CU residual flags cbf_cb, cbf_cr, and cbf_luma from the coded data.

(S1520: Decoding of TU information) In a case that a prediction error is included in the TU, the TU decoder 3024 decodes QP update information (quantization correction value) and a quantization prediction error (residual_coding) from the coded data. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied from the prediction image generation unit 308 and the prediction error supplied from the inverse quantization and inverse transform processing unit 311.

(S5000: Loop filter) The loop filter 305 generates a decoded image by applying a loop filter such as a deblocking filter, an SAO, and an ALF to the decoded image.

The parameter decoder 302 includes an inter prediction parameter decoder 303 and an intra prediction parameter decoder 304 (not illustrated). The prediction image generation unit 308 includes an inter prediction image generation unit 309 and an intra prediction image generation unit 310 (not illustrated).

Configuration of Intra Prediction Parameter Decoder 304

The intra prediction parameter decoder 304 decodes an intra prediction parameter, for example, an intra prediction mode IntraPredMode, with reference to a prediction parameter stored in the prediction parameter memory 307, based on a code input from the entropy decoder 301. The intra prediction parameter decoder 304 outputs a decoded intra prediction parameter to the prediction image generation unit 308, and also stores the decoded intra prediction parameter in the prediction parameter memory 307. The intra prediction parameter decoder 304 may derive different intra prediction modes depending on luminance and chrominance.

Figure 9:
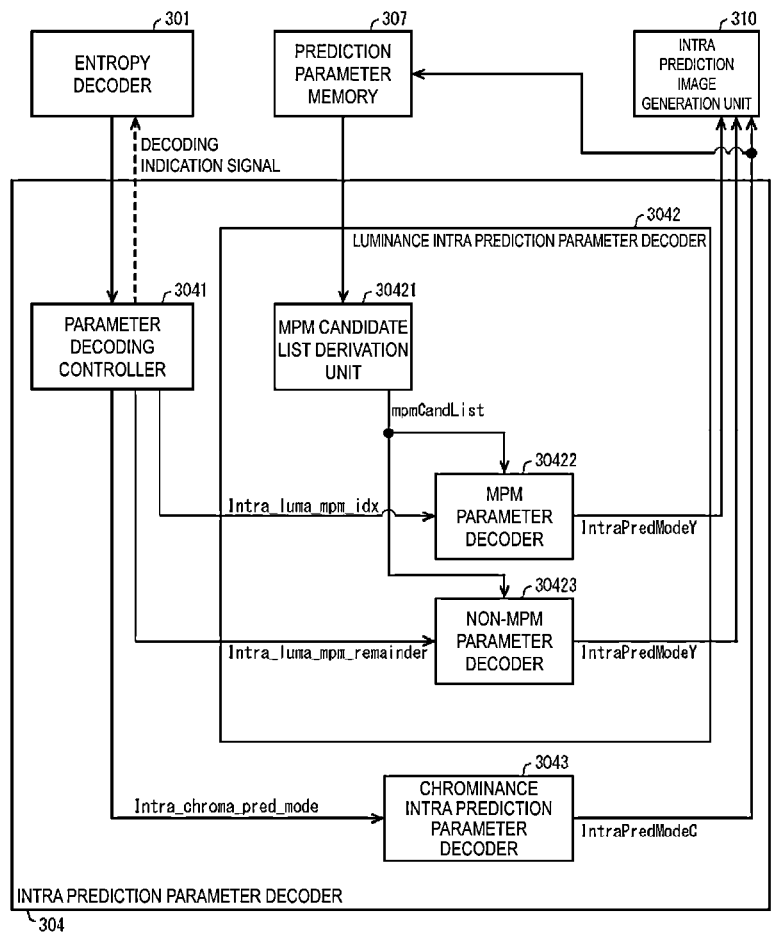
FIG. 9 is a schematic diagram illustrating a configuration of an intra prediction parameter decoder.

FIG. 9 is a schematic diagram illustrating a configuration of the intra prediction parameter decoder 304 of the parameter decoder 302. As illustrated in FIG. 9, the intra prediction parameter decoder 304 includes a parameter decoding controller 3041, a luminance intra prediction parameter decoder 3042, and a chrominance intra prediction parameter decoder 3043.

The parameter decoding controller 3041 commands the entropy decoder 301 to decode the syntax elements, and receives the syntax elements from the entropy decoder 301. In a case that intra_luma_mpm_flag among the syntax elements is 1, the parameter decoding controller 3041 outputs intra_luma_mpm_idx to an MPM parameter decoder 30422 in the luminance intra prediction parameter decoder 3042. In a case that intra_luma_mpm_flag is 0, the parameter decoding controller 3041 outputs intra_luma_mpm_remainder to a non-MPM parameter decoder 30423 of the luminance intra prediction parameter decoder 3042. The parameter decoding controller 3041 outputs the syntax elements of the intra prediction parameters of chrominance to the chrominance intra prediction parameter decoder 3043.

The luminance intra prediction parameter decoder 3042 includes the MPM candidate list derivation unit 30421, the MPM parameter decoder 30422, and the non-MPM parameter decoder 30423 (a decoder, a derivation unit).

The MPM parameter decoder 30422 refers to mpmCandList[ ] and intra_luma_mpm_idx derived by the MPM candidate list derivation unit 30421 and derives IntraPredModeY, and outputs IntraPredModeY to the intra prediction image generation unit 310.

The non-MPM parameter decoder 30423 derives RemIntraPredMode from mpmCandList[ ] and intra_luma_mpm- _remainder, and outputs IntraPredModeY to the intra prediction image generation unit 310.

The chrominance intra prediction parameter decoder 3043 derives IntraPredModeC from the syntax element of the intra prediction parameter of chrominance, and outputs IntraPredModeC to the intra prediction image generation unit 310.

The luminance intra prediction parameter decoder 3042 may further decode a flag intra_subpartitions_mode_flag indicating whether or not to perform intra subpartition that splits the CU into smaller subblocks and performs intra prediction. In a case that intra_subpartitions_mode_flag is other than 0, further, intra_subpartitions_split_flag is decoded. The intra subpartition mode is derived according to the following expression.

In a case that IntraSubPartSplitType=(intra_subpartitions_mode_flag==0) ? 0 : 1+intra_subpartitions_split_flag IntraSubPartSplitType is 0 (ISP_NO_SPLIT), the intra prediction is performed without further splitting the CU. In a case that IntraSubPartSplitType is 1 (ISP_HOR_SPLIT: horizontal split), the CU is split in the vertical direction from two to four subblocks, and in the subblock unit, the intra prediction, transform coefficient decoding, and inverse quantization and inverse transform are performed. In a case that IntraSubPartSplitType is 2 (ISP_VER_SPLIT: vertical split), the CU is split in the horizontal direction from two to four subblocks, and in the subblock unit, the intra prediction, transform coefficient decoding, and inverse quantization and inverse transform are performed. The split number NumIntraSubPart of subblocks is derived according to the following expression.

$$NumIntraSubPart = (cbWidth == 4 \ \&\& \ cbHeight == 8) \ ||$$

$$(cbWidth == 8 \ \&\& \ cbHeight == 4) ? 2:4$$

A width nW and a height nH of the subblock, and the split numbers nuMPartsX and nuMPartY in the horizontal direction and the vertical direction are derived as follows.

$$nW = (IntraSubPartSplitType == ISP\_VER\_SPLIT?)$$

$$nTbW / NumIntraSubPart: \ nTbW$$

$$nH = (IntraSubPartSplitType == ISP\_HOR\_SPLIT?)$$

$$nTbH / NumIntraSubPart: \ nTbH$$

$$nuMPartsX = (IntraSubPartSplitType == ISP\_VER\_SPLIT?)$$

$$NumIntraSubPart: \ 1$$

$$nuMPartsY = (IntraSubPartSplitType == ISP\_HOR\_SPLIT?)$$

$$NumIntraSubPart: \ 1$$

Here, nTbW and nTbH are respectively the width and the height of the CU (or the TU).

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores a parameter decoded by the parameter decoder 302, predMode separated by the entropy decoder 301, and the like.

To the prediction image generation unit 308, predMode, the prediction parameter, and the like are input. In addition, the prediction image generation unit 308 reads a reference picture from the reference picture memory 306. The prediction image generation unit 308 generates a prediction image of a block or a subblock by using the prediction parameter and the read reference picture (reference picture block) in the prediction mode indicated by predMode. Here, the reference picture block refers to a set of pixels (referred to as a block because they are normally rectangular) on a reference picture and is a region that is referred to for generating a prediction image.

Intra Prediction Image Generation Unit 310

In a case that predMode indicates the intra prediction mode, the intra prediction image generation unit 310 performs the intra prediction by using the intra prediction parameter input from the intra prediction parameter decoder 304 and the reference pixel read from the reference picture memory 306.

Specifically, the intra prediction image generation unit 310 reads, from the reference picture memory 306, neighboring blocks present with in a predetermined range from the target block on the target picture. The predetermined range refers to left, top left, top, and top right neighboring blocks of the target block, and a region being referred to is different depending on an intra prediction mode.

The intra prediction image generation unit 310 refers to the read decoded pixel value and the prediction mode indicated by the IntraPredMode, and generates the prediction image of the target block. The intra prediction image generation unit 310 outputs the generated prediction image of the block to the addition unit 312.

Figure 10:
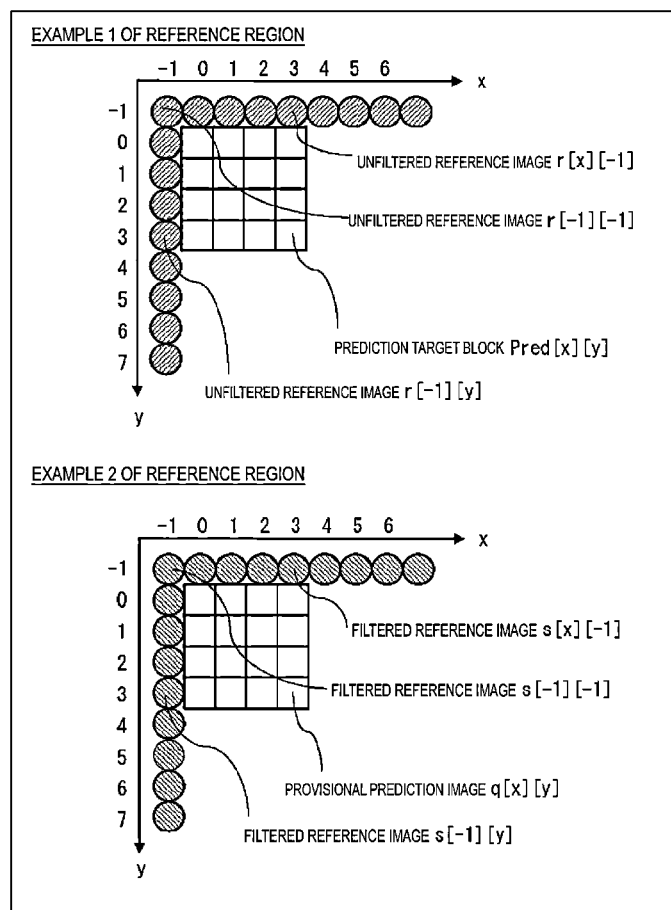
FIG. 10 is a diagram illustrating reference regions used for intra prediction.

Generation of the prediction image based on the intra prediction mode will be described below. In Planar prediction, DC prediction, and Angular prediction, a decoded peripheral region that is adjacent to a prediction target block is set as a reference region R. Then, by extrapolating the pixels on the reference region R in a specific direction, the prediction image is generated. For example, the reference region R may be set as an L-like region (for example, the region indicated by hatched circular pixels of example 1 of the reference region of FIG. 10) including the left and the top (or, in addition, the top left, the top right, and the bottom left) of the prediction target block.

Details of Prediction Image Generation Unit

Figure 11:
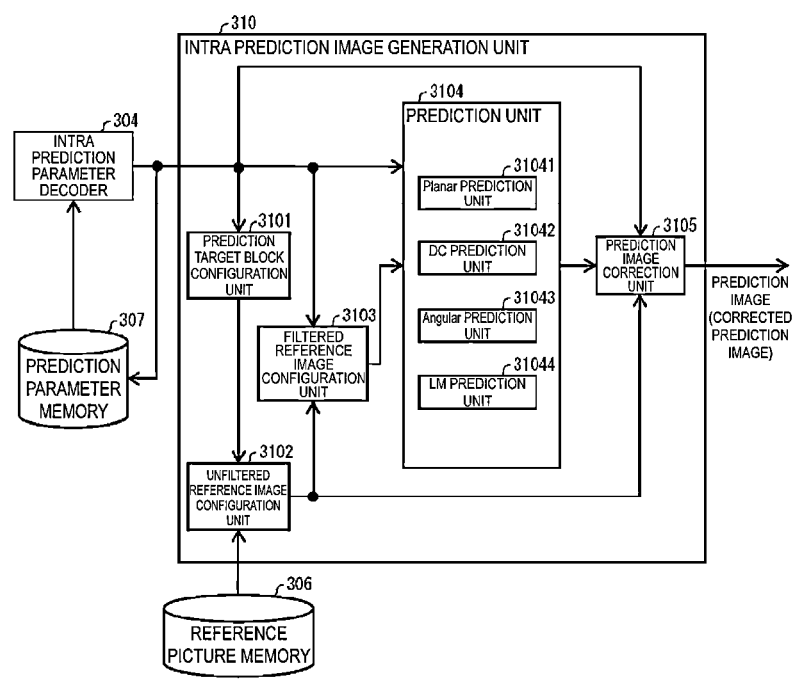
FIG. 11 is a diagram illustrating a configuration of an intra prediction image generation unit.

Next, with reference to FIG. 11, details of the configuration of the intra prediction image generation unit 310 will be described. The intra prediction image generation unit 310 includes a prediction target block configuration unit 3101, an unfiltered reference image configuration unit 3102 (first reference image configuration unit), a filtered reference image configuration unit 3103 (second reference image configuration unit), an intra prediction unit 3104, and a prediction image correction unit 3105 (prediction image correction unit, filter switching unit, weight coefficient changing unit).

Based on each reference pixel (unfiltered reference image) on the reference region R, the filtered reference image generated by applying a reference pixel filter (first filter), and the intra prediction mode, the intra prediction unit 3104 generates a provisional prediction image (pre-corrected prediction image) of the prediction target block, and outputs the provisional prediction image to the prediction image correction unit 3105. The prediction image correction unit 3105 modifies the provisional prediction image according to the intra prediction mode, generates a prediction image (corrected prediction image), and outputs the prediction image.

Each unit included in the intra prediction image generation unit 310 will be described below.

Prediction Target Block Configuration Unit 3101

The prediction target block configuration unit 3101 sets the target CU to the prediction target block, and outputs information (prediction target block information) related to the prediction target block. The prediction target block information at least includes an index indicating the size of the prediction target block, the position thereof, and whether it is luminance or chrominance Unfiltered Reference Image Configuration Unit 3102

The unfiltered reference image configuration unit 3102 sets a neighboring peripheral region of the prediction target block as the reference region R, based on the size and the position of the prediction target block. Subsequently, the unfiltered reference image configuration unit 3102 sets each pixel value (unfiltered reference image, boundary pixel) in the reference region R equal to each decoded pixel value of a corresponding position on the reference picture memory 306. A line r[x][−1] of decoded pixels adjacent to the upper side of the prediction target block and a column r[−1][y] of decoded pixels adjacent to the left side of the prediction target block illustrated in example 1 of the reference region of FIG. 10 correspond to the unfiltered reference image.

Filtered Reference Image Configuration Unit 3103

The filtered reference image configuration unit 3103 applies the reference pixel filter (first filter) to the unfiltered reference image according to the intra prediction mode, and derives a filtered reference image s[x][y] at each position (x, y) on the reference region R. Specifically, the filtered reference image configuration unit 3103 applies a low-pass filter to the unfiltered reference image at and around the position (x, y), and derives the filtered reference image (example 2 of the reference region of FIG. 10). Note that the low-pass filter need not necessarily be applied to all of the intra prediction modes, and the low-pass filter may be applied to some of the intra prediction modes. Note that a filter applied to the unfiltered reference image on the reference region R in the filtered reference image configuration unit 3103 is referred to as a "reference pixel filter (first filter)", whereas a filter that corrects the provisional prediction image in the prediction image correction unit 3105 to be described later is referred to as a "boundary filter (second filter)".

Configuration of Intra Prediction Unit 3104

The intra prediction unit 3104 generates the provisional prediction image (provisional prediction pixel value, pre-corrected prediction image) of the prediction target block based on the intra prediction mode, the unfiltered reference image, and the filtered reference pixel value, and outputs the provisional prediction image to the prediction image correction unit 3105. The intra prediction unit 3104 includes, in its inside, a Planar prediction unit 31041, a DC prediction unit 31042, an Angular prediction unit 31043, and an LM prediction unit 31044. The intra prediction unit 3104 selects a specific prediction unit according to the intra prediction mode, and inputs the unfiltered reference image and the filtered reference image. The relationships between the intra prediction mode and its corresponding prediction unit are as follows.

Planar prediction . . . Planar prediction unit 31041
DC prediction . . . DC prediction unit 31042
Angular prediction . . . Angular prediction unit 31043
LM prediction . . . LM prediction unit 31044

Planar Prediction

The Planar prediction unit 31041 linearly adds multiple filtered reference images according to a distance between a prediction target pixel position and a reference pixel position to generate the provisional prediction image, and outputs the provisional prediction image to the prediction image correction unit 3105.

DC Prediction

The DC prediction unit 31042 derives a DC prediction value corresponding to an average value of the filtered reference image s[x][y], and outputs a provisional prediction image q[x][y] with its DC prediction value being a pixel value.

Angular Prediction

The Angular prediction unit 31043 generates the provisional prediction image q[x][y] by using the filtered reference image s[x][y] in a prediction direction (reference direction) indicated by the intra prediction mode, and outputs the provisional prediction image q[x][y] to the prediction image correction unit 3105.

LM Prediction

The LM prediction unit 31044 predicts a pixel value of chrominance, based on a pixel value of luminance. Specifically, this is a method of generating a prediction image of a chrominance image (Cb, Cr) by using a linear model based on a decoded luminance image. Cross-Component Linear Model prediction (CCLM) prediction being one of the LM prediction is a prediction method of using a linear model for predicting chrominance from luminance for one block.

Configuration of Prediction Image Correction Unit 3105

The prediction image correction unit 3105 modifies the provisional prediction image output from the intra prediction unit 3104 according to the intra prediction mode. Specifically, the prediction image correction unit 3105 performs weighted addition (weighted average) of the unfiltered reference image and the provisional prediction image for each pixel of the provisional prediction image according to a distance between the reference region R and a target prediction pixel, and thereby derives a prediction image (corrected prediction image) Fred obtained after modifying the provisional prediction image. Note that, in some of the intra prediction modes, the output of the intra prediction unit 3104 may be directly used as the prediction image, without correcting the provisional prediction image in the prediction image correction unit 3105.

Inverse Quantization and Inverse Transform Processing Unit 311

The inverse quantization and inverse transform processing unit 311 performs inverse quantization on a quantization transform coefficient qd[ ][ ] input from the entropy decoder 301 and thereby derives a transform coefficient d[ ][ ]. The quantization transform coefficient qd[ ][ ] is a coefficient that is obtained by performing frequency transform and quantization on a prediction error in coding processing. The frequency transform is such as Discrete Cosine Transform (DCT) and Discrete Sine Transform (DST). The inverse quantization and inverse transform processing unit 311 performs inverse frequency transform, such as inverse DCT and inverse DST, on the derived transform coefficient, and calculates the prediction error. The inverse quantization and inverse transform processing unit 311 outputs the prediction error to the addition unit 312.

Figure 12:
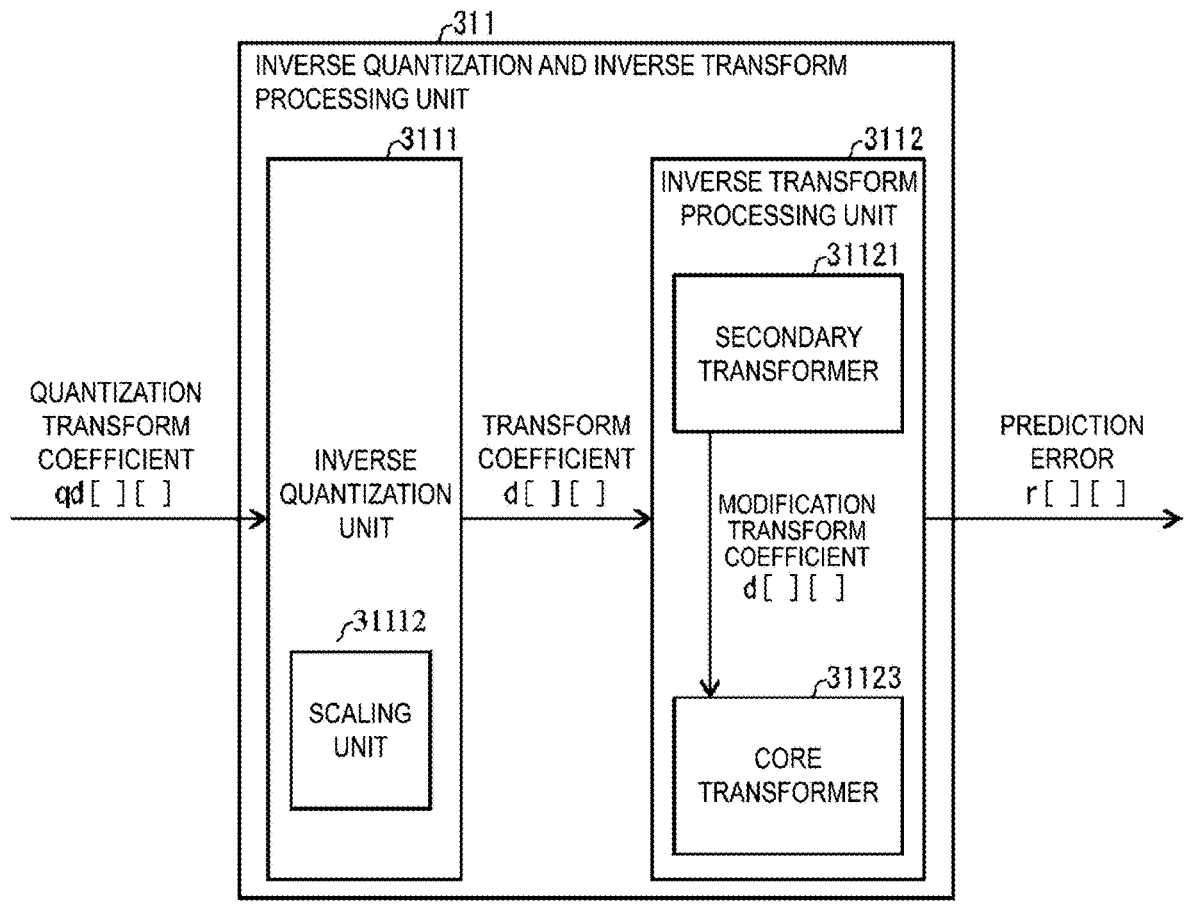
FIG. 12 is a functional block diagram illustrating a configuration example of an inverse quantization and inverse transform processing unit.

A configuration example of the inverse quantization and inverse transform processing unit 311 will be described below with reference to FIG. 12. FIG. 12 is a functional block diagram illustrating a configuration example of the inverse quantization and inverse transform processing unit 311. As illustrated in FIG. 12, the quantization and inverse transform processing unit 311 includes an inverse quantization unit 3111 and a transformer 3112. The inverse quantization unit 3111 performs inverse quantization on the quantization transform coefficient qd[ ][ ] decoded in the TU decoder 3024, and derives the transform coefficient d[ ][ ]. The inverse quantization unit 3111 outputs the derived transform coefficient d[ ][ ] to the transformer 3112.

The transformer 3112 performs inverse transform on the received transform coefficient d[ ][ ] for each transform unit TU, and reconstructs a prediction error r[ ][ ]. The transformer 3112 outputs the reconstructed prediction error r[ ][ ] to the addition unit 312.

Note that, in this specification, processing of transforming a difference image in the image coding apparatus into a transform coefficient is referred to as a forward transform, and processing of transforming from a transform coefficient in the image decoding apparatus into a difference image is referred to as transform. However, the processings may be referred to as transform and inverse transform, respectively. Note that the forward transform (transform) and the transform (inverse transform) have no difference in their processing except for values of a transform matrix used as a transform basis. Thus, in the following description, regarding transform processing in the transformer 3112, the term "inverse transform" may be used instead of "transform".

The transformer 3112 includes a secondary transformer (second transformer) 31121 and a core transformer (first transformer) 31123.

The TU decoder 3024 may decode a subblock transform flag cu_sbt_flag for further splitting the CU into multiple subblocks and performing decoding, inverse quantization, and inverse transform of a transform coefficient of only one subblock out of the multiple subblocks. In a case that cu_sbt_flag is 1, further, flag cu_sbt_quad_flag indicating whether split into four subblocks is performed may be decoded. In a case that cu_sbt_quad_flag is 0, the number of subblocks is 2. In a case that cu_sbt_quad_flag is 1, the number of subblocks is 4. Further, cu_sbt_horizontal_flag indicating horizontal split or vertical split is decoded. Further, cu_sbt_pos_flag indicating in which subblock the transform coefficient is included is decoded.

Scaling Unit 31112

The scaling unit 31112 performs scaling for the transform coefficient decoded by the TU decoder by using a weight in the coefficient unit.

In a case that transform skip is enabled (transform_skip==1), the scaling unit 31112 performs scaling according to the following expression.

$$r[x][y] = d[x][y] << tsShift$$

Here, $tsShift = 5 + ((\log2(nTbW) + \log2(nTbH))/2)$.

Otherwise, a quantization matrix m[x][y] and a scaling factor ls[x][y] are derived according to the following expression.

$$ls[x][y] = (m[x][y] * levelScale[(qP+1) \% 6]) << (qP/6)$$

Alternatively, the following expression may be used for the derivation.

$$ls[x][y] = (m[x][y] * levelScale[qP \% 6]) << (qP/6)$$

Here, $levelScale[\ ] = \{40, 45, 51, 57, 6472\}$.

Note that a value of the quantization matrix m[x][y] may be decoded from coded data, or m[x][y]=16 may be used as uniform quantization.

The scaling unit 31112 derives dnc[ ][ ] from a product of scaling factor ls[ ][ ] and decoded transform coefficient TransCoeffLevel, and performs inverse quantization.

$$dnc[x][y] =$$
$$(TansCoeffLevel[xTbY][yTbY][cIdx][x][y] * ls[x][y] * rectNorm +$$
$$bdOffset >> bdShift$$

Finally, the scaling unit 31112 clips the transform coefficient subjected to inverse quantization and derives d[x][y].

$$d[x][y] = Clip3(CoeffMin, CoeffMax, dnc[x][y])$$

d[x][y] is transmitted to the core transformer 31123 or the secondary transformer 31121. The secondary transformer (second transformer) 31121 applies secondary transform to the transform coefficient d[ ][ ] after inverse quantization and before core transform.

Secondary Transform and Core Transform

The secondary transformer 31121 applies transform using the transform matrix to a part or all of the transform coefficients d[ ][ ] received from the inverse quantization unit 3111, and thereby reconstructs a modification transform coefficient (transform coefficient after being transformed by the second transformer) d[ ][ ]. The secondary transformer 31121 applies secondary transform to a prescribed unit of transform coefficients d[ ][ ] for each transform unit TU. The secondary transform is applied only in the intra CU, and the transform basis is determined with reference to the intra prediction mode IntraPredMode. Selection of the transform basis will be described later. The secondary transformer 31121 outputs the reconstructed modification transform coefficient d[ ][ ] to the core transformer 31123.

The core transformer 31123 acquires the transform coefficient d[ ][ ] or the modification transform coefficient d[ ][ ] resconstructed by the secondary transformer 31121, performs transform, and derives the prediction error r[ ][ ]. The core transformer 31123 outputs the prediction error r[ ][ ] to the addition unit 312.

Secondary Transform

Figure 19:
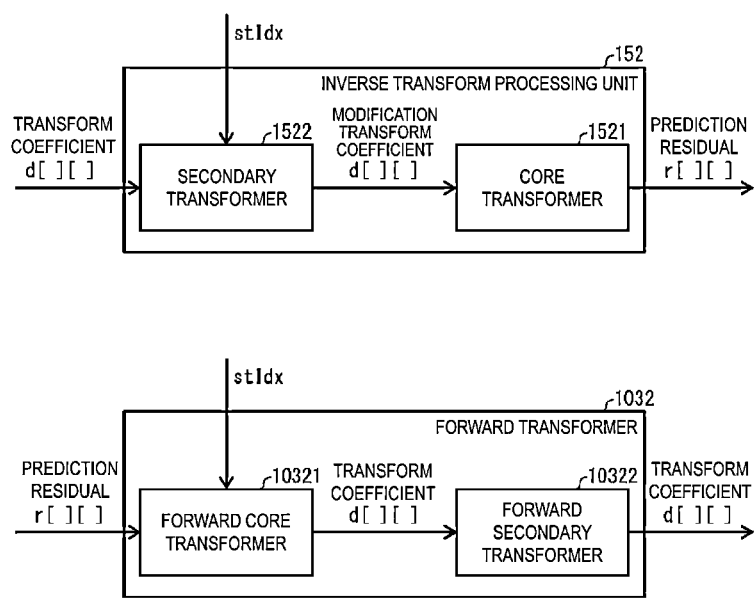
FIG. 19 is a block diagram for describing secondary transform and core transform.

In the video coding apparatus 11, transform (forward secondary transform) is further applied to the transform coefficients after core transform (DCT2, DST7, and the like) of the difference image, correlation remaining in the transform coefficients is removed, and energy is concentrated on a part of the transform coefficients. A forward transformer 1032 included in a transform and quantization unit 103 and an inverse transform processing unit 152 included in an inverse transform processing and inverse quantization unit 105 of the video coding apparatus 11 are illustrated in FIG. 19. In the video decoding apparatus 3, conversely, secondary transform is applied to the transform coefficients of a part or all of the region of the decoded TU, and core transform (DCT2, DST7, and the like) is applied to the transform coefficients after secondary transform.

Figure 13:
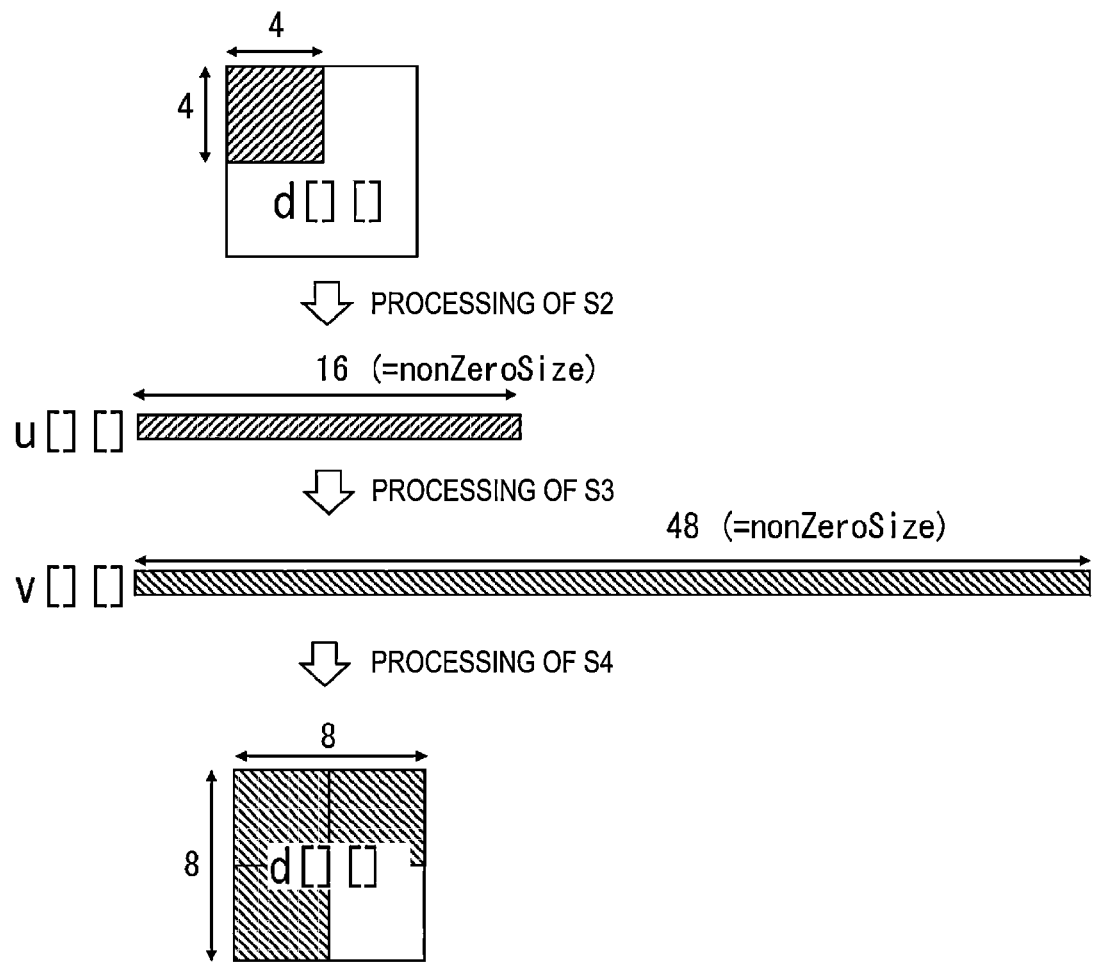
FIG. 13 is a diagram illustrating a transform range of secondary transform.

In the secondary transform, the following processing is performed according to the size and the intra prediction mode of the TU. Processing of the secondary transform will be described below in sequence. FIG. 13 is a diagram illustrating secondary transform. The figure illustrates the following processing: regarding the TU of 8×8, the transform coefficients d[ ][ ] of a region of 4×4 is stored in a one-dimensional array u[ ] of nonZeroSize in processing of S2, the one-dimensional array u[ ] is transformed into a one-dimensional array v[ ] in processing of S3, and lastly the one-dimensional array v[ ] is again stored in d[ ][ ] in processing of S4.

Figure 24:
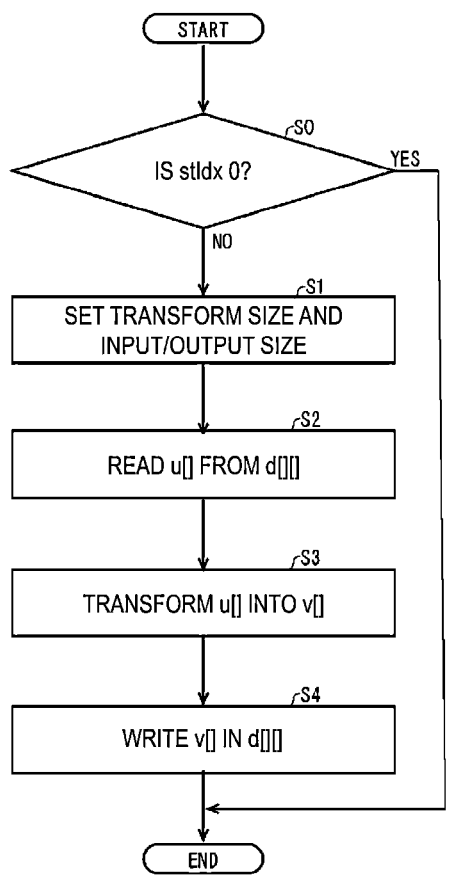
FIG. 24 is a flowchart illustrating processing of secondary transform.

FIG. 24 is a flowchart illustrating processing of secondary transform.

S1: Set Transform Size and Input/Output Size

The secondary transformer 31121 derives the size (4×4 or 8×8) of the secondary transform, the number (nStOutSize) of transform coefficients of output, the number nonZeroSize of transform coefficients (transform coefficients of input) to be applied, and the number (numStX, numStY) of subblocks to which secondary transform is applied, according to the size (width nTbW, height nTbH) of the TU. The size of secondary transform of 4×4, 8×8 is represented by nStSize=4, 8. The size of secondary transform of 4×4, 8×8 may be referred to as RST 4×4, RST 8×8, respectively.

In a case that the TU has a prescribed size or larger, the secondary transformer 31121 outputs 48 transform coefficients, as a result of secondary transform of RST 8×8. Otherwise, 16 transform coefficients are output as a result of secondary transform of RST 4×4. In a case that the TU is 4×4, 16 transform coefficients are derived from 8 transform coefficients by using RST 4×4, and in a case that the TU is 8×8, 48 transform coefficients are derived from 8 transform coefficients by using RST 8×8. Otherwise, 16 or 48 transform coefficients are output from 16 transform coefficients according to the size of the TU.

In a case that both nTbW and nTbH are 8 or larger, log2StSize=3, nStOutSize=48. Otherwise, log2StSize=2, nStOutSize=16.

$$nStSize = 1 << log2StSize$$

In a case that both nTbW and nTbH are 4 or 8×8, nonZeroSize=8.
Otherwise, nonZeroSize=16.

$$numStX = (nTbH == 4 \;\&\&\; nTbW > 8)?\; 2:1$$
$$numStY = (nTbW == 4 \;\&\&\; nTbH > 8)?\; 2:1$$

S2: Rearrange into One-Dimensional Signal

The secondary transformer 31121 rearranges a part of the transform coefficients d[ ][ ] of the TU into the one-dimensional array u[ ] for one time to perform processing. Specifically, in secondary transform, u[ ] is derived from the two-dimensional transform coefficients d[ ][ ] of the target TU with reference to the transform coefficients of x=0 nonZeroSize−1. xC, yC are positions on the TU, and are derived from an array DiagScanOrder indicating scan order and a position x of the transform coefficient in the subblock.

```
for (x = 0; x < nonZeroSize; x ++) {
    xC = (xSbIdx << log2StSize) + DiagScanOrder[log2StSize][log2StSize][x][0]
    yC = (ySbIdx << log2StSize) + DiagScanOrder[log2StSize][log2StSize][x][1]
    u[x] = d[ xC ][ yC ]
}
```

S3: Application of Transform Processing

The secondary transformer 31121 performs transform using a first type of transform basis (matrix) T on u[ ] (vector F') having a length of nonZeroSize, and derives a one-dimensional array v'[ ] (vector V') having a length of nStOutSize as output.

The transform can be expressed by the following expression in matrix operation.

$$V' = T \times F'$$

Here, the transform basis in a case that the transform size is 4×4 (RST 4×4) is referred to as a first type of transform basis T1. The transform basis in a case that the transform size is 8×8 (RST 8×8) is referred to as a second type of transform basis T2. T1 is a 16×16 (16 rows and 16 columns) matrix, and through the transform, a 16×1 (16 rows and 1 column) vector V', that is, a one-dimensional array v'[ ]

having a length of 16, is derived as a product of the 16×16 matrix T1 and the 16×1 (16 rows and 1 column) vector F'. T2 is a 48×16 (48 rows and 16 columns) matrix, and through the transform, a 48×1 (48 rows and 1 column, length of 48) vector V', that is, a one-dimensional array v'[ ] having a length of 48, is derived as a product of the 48×16 matrix T2 and the 48×1 (48 rows and 1 column, length of 48) vector V'.

Specifically, the secondary transformer 31121 derives a corresponding transform matrix secTranMatrix[ ][ ] (transform basis T1 or T2) from a set number (stTrSetId) of secondary transform derived from the intra prediction mode IntraPredMode, stIdx indicating the transform basis of secondary transform decoded from coded data, and the secondary transform size nStSize (nTrS). In addition, as shown in the following expression, the secondary transformer 31121 performs multiply-accumulate operation of the transform matrix and the one-dimensional array u[ ].

$$v'[i] = Clip3(CoeffMin, CoeffMax, \Sigma secTransMatrix[j][i] * u[j])$$

Here, $\Sigma$ is the sum up to j=0 . . . nonZeroSize−1. Further, i is performed processing on 0 . . . nStSize−1. CoeffMin, CoeffMax represent a range of a value of the transform coefficients.

S4: Two-Dimensional Arrangement of One-Dimensional Signal after Transform Processing The secondary transformer 31121 arranges the coefficients v'[ ] of one-dimensional array being transformed at a prescribed position in the TU again.

In processing S4, the secondary transformer 31121 arranges the coefficients v'[ ] having a length of nStOutSize obtained through the processing S3 described above in a top left region of the array d[ ][ ] of the transform coefficients.

The secondary transformer 31121 performs the following processing on x=0 . . . nStSize−1, y=0 . . . nStSize−1. Specifically, in a case of IntraPredMode<=34 or INTRA_LT_CCLM, INTRA_T_CCLM, or INTRA_L_CCLM, the secondary transformer 31121 applies the following expression.

$$d[(xSbIdx << log2StSize) + x][(ySbIdx << log2StSize) + y] =$$
$$(y < 4)?v[x + (y << log2StSize)]: ((x < 4)?v[32 + x + ((y - 4) << 2)]:$$
$$d[(xSbIdx << log2StSize) + x][(ySbIdx << log2StSize + y)])$$

Otherwise, the secondary transformer 31121 applies the following expression.

$$d[(xSbIdx << log2StSize) + x][(ySbIdx << log2StSize) + y] =$$
$$(y < 4)?v[y + (x << log2StSize)]: ((x < 4)?v[32 + (y - 4) + (x << 2)]:$$
$$d[(xSbIdx << log2StSize) + x][(ySbIdx << log2StSize + y)])$$

Core Transformer 31123

Core Transform

Transform that can adaptively switch methods of transform and that can be switched with an explicit flag, index, prediction mode, or the like is referred to as transform (first transform, core transform). The transform (core transform) used in the core transform is separate transform including vertical transform and horizontal transform. Transform that separates a two-dimensional signal in the horizontal direction and the vertical direction may be defined as first transform. In the image decoding apparatus, transform applied after second transform (secondary transform) may be defined as first transform. The transform basis (transform matrix) of the core transform is DCT2, DST7, or DCT8. In the core transform, the transform basis is switched in vertical transform and horizontal transform independently of each other. Note that selectable transform is not limited to the above, and other transform (transform basis) can be used. Note that DCT2, DST7, DCT8, DST1, and DCT5 may be represented by DCT-II, DST-VII, DCT-VIII, DST-I, and DCT-V, respectively. Further, there may be transform skip as a mode of explicitly skipping the core transform.

The core transform includes explicit MTS and implicit MTS. In a case of explicit MTS, mts_idx is decoded from coded data, and the transform matrix is switched. In a case of implicit MTS, mts_idx is derived according to the intra prediction mode and the block size.

Note that the present example describes an example in which mts_idx is decoded in the CU unit or the TU unit. However, the unit of decoding (switching) is not limited thereto.

mts_idx is a switch index for selecting the transform basis of the core transform. mts_idx has a value of one of 0, 1, 2, 3, or 4, and derives a transform type trTypeHor in the horizontal direction and a transform type trTypeVer in the vertical direction.

Figure 18:
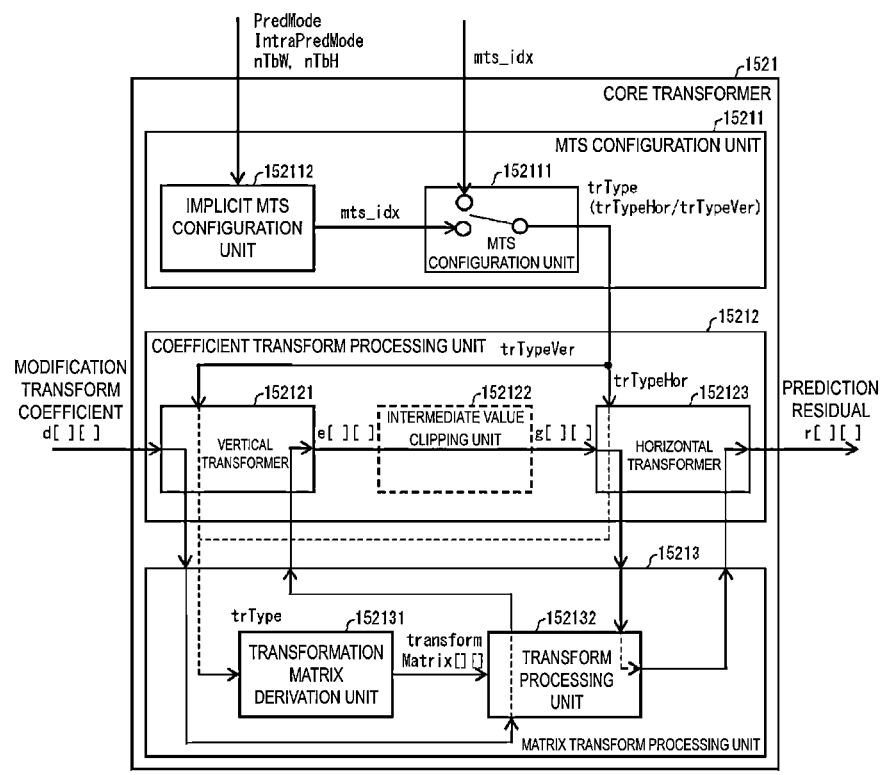
FIG. 18 is a block diagram for describing a core transformer 1521.

The core transform described above will be specifically described with reference to FIG. 18. A core transformer 1521 of FIG. 18 is an example of the core transformer 31123 of FIG. 12 and a core transformer 1521 of FIG. 19. The core transformer 1521 of FIG. 18 includes an MTS configuration unit 15211 that sets a type of transform to be used out of multiple transform bases, a coefficient transform processing unit 15212 that calculates a prediction residual r[ ][ ] from the (modification) transform coefficient d[ ][ ] by using the derived transform, and a matrix transform processing unit 15213 that performs actual transform. In a case that secondary transform is not performed, the modification transform coefficient is the same as the transform coefficient. In a case that secondary transform is performed, the modification transform coefficient has a value different from the transform coefficient. The MTS configuration unit 15211 includes an MTS configuration unit 152111 that determines a derivation method of an index mts_ids of transform to be used, and an implicit MTS configuration unit 152112 that implicitly derives mts_idx.

The MTS configuration unit 152111 selects whether explicit MTS is performed, implicit MTS is performed, or MTS is not performed.

In a case that explicit MTS is enabled (case that sps_explicit_mts_flag is 1), the MTS configuration unit 152111 uses explicit MTS, and uses mts_idx decoded from coded data in later processing. A flag explicitMtsEnabled indicating whether explicit MTS is enabled may be set separately for the intra mode and the inter mode. In this case, in a case that the prediction mode PredMode is the inter mode (other than MODE_INTRA) and sps_explicit_mts_inter_enabled_flag is 1, or PredMode is the intra mode (MODE_INTRA) and sps_explicit_mts_intra_enabled_flag is 1, it may be determined that explicit MTS is enabled, and mts_idx may be decoded from coded data. In addition, mts_idx may be decoded only in a case that both of the width and the height of the TU are 32 or less (nTbW<=32 && nTbH<=32).

Set implicitMTS Flag

In a case that the MTS flag is enabled (sps_mts_enabled_flag==1) and the explicit MTS flag does not indicate enabled (explicitMtsEnabled==0), the MTS configuration unit 152111 sets the implicit MTS flag (implicitMtsEnabled) equal to 1. More specifically, in a case that one of the following conditions is satisfied, the MTS configuration unit 152111 sets implicitMtsEnabled=1, otherwise the MTS configuration unit 152111 sets implicitMtsEnabled=0.

- In a case that intra subpartition is enabled (IntraSubPartSplitType!=ISP_NO_SPLIT)
- In a case that CU sub-transform is enabled, and the TU is less than a prescribed size (cu_sbt_flag==1 and Max (nTbW, nTbH)<32)
- In a case that explicit MTS is off (both of sps_explicit_mts_intra_enabled_flag and sps_explicit_mts_inter_enabled_flag are 0) and PredMode is MODE_INTRA Otherwise, the MTS configuration unit 152111 sets mts_idx=0.

Explicit MTS

In a case that explicit MTS indicates enabled (in a case that sps_explicit_mts_flag is 1), the TU decoder 3024 decodes mts_idx from coded data.

Explicit MTS Constraints

The TU decoder 3024 may constrain a range (type) of the transform matrix selected in the transformer, according to whether or not secondary transform is enabled. For example, in a case that explicit MTS is enabled, and secondary transform is enabled (stIdx!=0), the TU decoder 3024 decodes mts_idx of a maximum value cMaxSt1. Otherwise, in a case that secondary transform is not enabled (stIdx==0), the TU decoder 3024 decodes mts_idx of a maximum value cMaxSt0. Here, cMaxSt0>cMaxSt1 holds.

Constraint Example 1

In a case that explicit MTS is enabled, and secondary transform is enabled (stIdx!=0), the TU decoder 3024 sets mts_idx=0 (trTypeHor=trTypeVer=0=DCT2). In this case, the maximum value cMax of mts_idx is 0. Otherwise, one of mts_idx=0, 1, 2, 3, or 4 is decoded. In this case, the maximum value cMax of mts_idx is 4. Note that, as will be described later, mts_idx=1, 2, 3, 4 may be a combination of DST7 and DCT8, a combination of DCT8 and DST7, or a combination of DCT8 and DCT8, each as trTypeHor, trTypeVer. Note that, instead of DST7, DST1 or DCT4 may be used, or transform combining pre and post processings and DCT2 may be performed.

Constraint Example 2

In a case that explicit MTS is enabled, and secondary transform is enabled (stIdx!=0), the TU decoder 3024 decodes mts_idx. mtx_idx is 0 (trTypeHor=trTypeVer=0=DCT2), or 1 (trTypeHor=trTypeVer=1=DST7). In this case, the maximum value cMax of mts_idx is 1. Otherwise, one of 0, 1, 2, 3, or 4 is decoded as mts_idx. In this case, the maximum value cMax of mts_idx is 4. Note that, as will be described later, mts_idx=2, 3, 4 may be a combination of DST7 and DCT8, a combination of DCT8 and DST7, or a combination of DCT8 and DCT8, each as trTypeHor, trTypeVer.

Constraint Example 3

In a case that explicit MTS is enabled, and secondary transform is on (stIdx!=0), the TU decoder 3024 decodes one of 0, 1, or 2 as mts_idx. In this case, the maximum value cMax of mts_idx is 2. Otherwise, one of 0, 1, 2, 3, or 4 is decoded as mts_idx. In this case, the maximum value cMax of mts_idx is 4.

According to the configuration described above, in a case of secondary transform, a range in which MTS is enabled can be limited, and therefore an effect of simplifying coding is exerted. For example, in constraint example 2, secondary transform is not performed in a case of DCT8 where the effect overlaps with secondary transform, and therefore an effect of reducing overhead due to mts_idx and enhancing coding efficiency is exerted.

Gist of Explicit MTS

Provided is an image decoding apparatus including a transformer that transforms a transform coefficient for each TU. The transformer includes: a second transformer that applies transform using a transform matrix to an input transform coefficient in a case that secondary transform is enabled; and a first transformer that selects one transform matrix indicated by mtx_idx out of two or more transformation matrices and applies transform to the transform coefficient. In a case that secondary transform is enabled (stIdx!=0), the TU decoder that decodes mts_idx decodes a value in a first range as mts_idx, and in a case that secondary transform is not enabled (stIdx==0), the TU decoder decodes a value in a second range. The second range includes the first range. The TU decoder decodes mts_idx. Here, mts_idx has the following configuration: in a case that secondary transform is enabled (stIdx!=0), the maximum value is cMaxSt1, in a case that secondary transform is not enabled (stIdx==0), the maximum value is cMaxSt0, and cMaxSt1<cMaxSt0 holds.

Implicit MTS

In a case of implicit MTS, the implicit MTS configuration unit 152112 performs the following processing.

(SM001) In a case that the implicit MTS configuration unit 152112 uses the intra subpartition mode (IntraSubPartSplitType!=ISP_NO_SPLIT), as illustrated in FIG. 14, the implicit MTS configuration unit 152112 sets the transform type tyTypeHor equal to either 0 (DCT2) or 1 (DST7) and sets the transform type tyTypeVer equal to either 0 (DCT2) or 1 (DST7) according to the intra prediction mode IntraPredMode and the TU size.

(SM002) Otherwise, and subblock transform is enabled (cu_sbt_flag==1), as illustrated in FIG. 15, the implicit MTS configuration unit 152112 sets tyTypeHor equal to either 1 (DST7) or 2 (DCT8) and sets tyTypeVer equal to either 1 (DST7) or 2 (DCT8) according to cu_sbt_horizontal_flag and cu_sbt_pos_flag.

Figure 21:
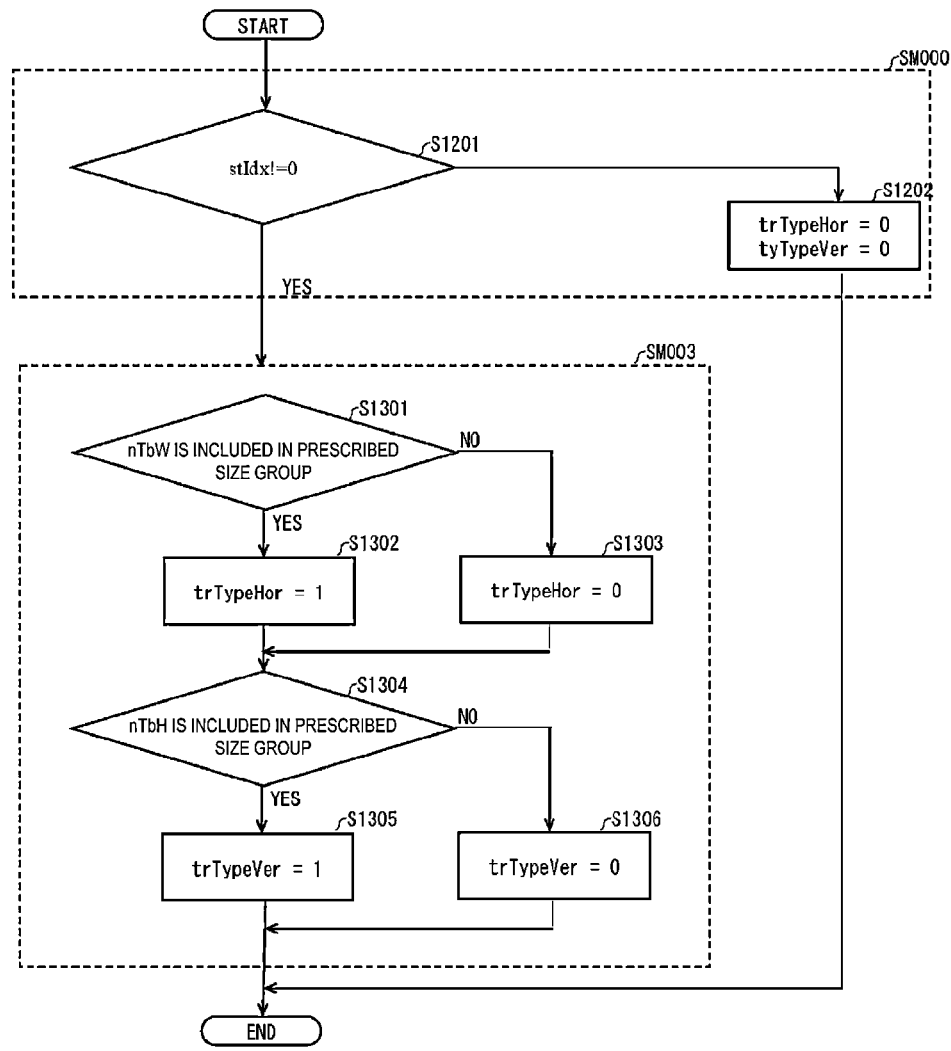
FIG. 21 is a flowchart illustrating operation of the MTS configuration unit 15211 according to the embodiment.

(SM003) Otherwise (default implicit MTS), the implicit MTS configuration unit 152112 sets the transform type tyTypeHor equal to either 0 (DCT2) or 1 (DST7) and sets the transform type tyTypeVer equal to either 0 (DCT2) or 1 (DST7) according to the TU size (width nTbW, height nTbH). Specifically, as illustrated in FIG. 21, in a case that the width nTbW is within a prescribed range (S1301), the horizontal transform type trTypeHor is set equal to 1 (DCT1) (S1302), otherwise the horizontal transform type trTypeHor is set equal to 0 (DCT2) (S1303). Similarly, in a case that the height nTbH is within a prescribed range (S1304), the vertical transform type trTypeVer is set equal to 1 (DCT1) (S1305), otherwise the vertical transform type trTypeVer is set equal to 0 (DCT2) (S1306).

$$trTypeHor = (nTbW >= 4 \;\&\&\; nTbW <= 16 \;\&\&\; nTbW <= nTbH)?1:0$$

$$trTypeVer = (nTbH >= 4 \;\&\&\; nTbH <= 16 \;\&\&\; nTbH <= nTbW)?1:0$$

Note that the prescribed range is not limited to the above. For example, the following may be used.

$$trTypeHor = (nTbW >= 4 \;\&\&\; nTbW <= 8 \;\&\&\; nTbW <= nTbH)?1:0$$

$$trTypeVer = (nTbH >= 4 \;\&\&\; nTbH <= 8 \;\&\&\; nTbH <= nTbW)?1:0$$

The default implicit MTS described above is the most general mode of implicit MTS.

First Embodiment of Implicit MTS

Figure 20:
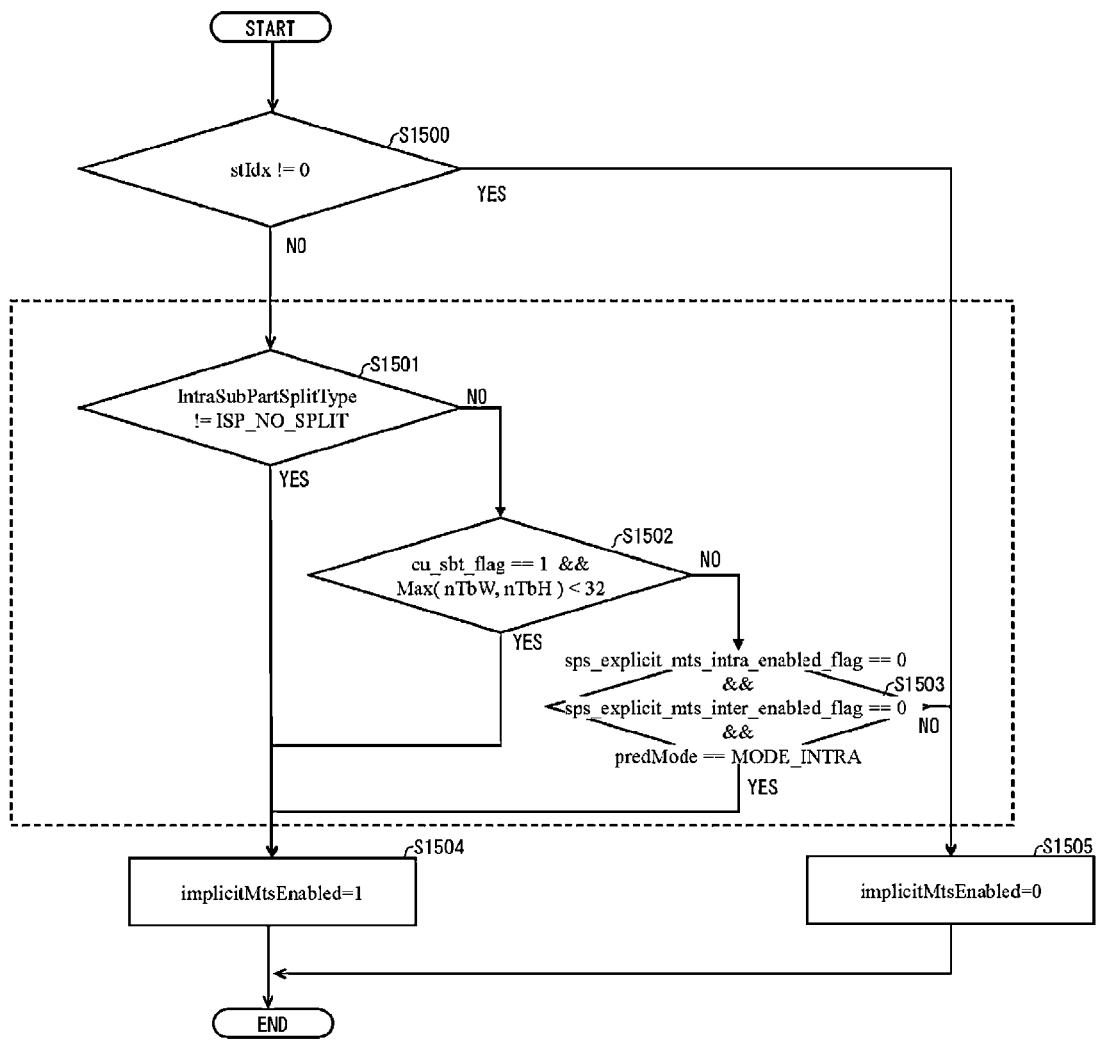
FIG. 20 is a flowchart illustrating operation of an MTS configuration unit 15211 according to an embodiment.

In a case that the secondary transform is enabled (stIdx!=0), the MTS configuration unit 15211 does not perform implicit MTS, and sets implicitMtsEnabled equal to 0. Specifically, as illustrated in FIG. 20, in the above section Set implicitMTS Flag, in a case that one of the following conditions is satisfied, and secondary transform is not enabled (other than stIdx!=0) (S1500), the MTS configuration unit 152111 sets implicitMtsEnabled=1 (S1504), otherwise the MTS configuration unit 152111 sets implicitMtsEnabled=0 (S1505).
- (S1501) In a case that intra subpartition is enabled (IntraSubPartSplitType!=ISP_NO_SPLIT)
- (S1502) In a case that CU sub-transform is enabled, and the TU is less than a prescribed size (cu_sbt_flag==1 and Max(nTbW, nTbH)<32)
- (S1503) Explicit MTS is off (both of sps_explicit_mts_intra_enabled_flag and sps_explicit_mts_inter_enabled_flag are 0), and PredMode is MODE_INTRA Note that the determinations of S1501 to S1503 indicated in the dotted boxes in the figure may be different determinations. For example, a case that determination of intra subpartition is not performed, a case that subblock transform is not performed, and further, determination of other prediction and transform may be added.

According to the configuration described above, even in a case that MTS is enabled, implicit MTS is not used in a case that secondary transform is used (stIdx!=0). Accordingly, in a case that secondary transform is used, by using DCT2 as MTS, an effect of enhancing coding efficiency is exerted.

Second Embodiment of Implicit MTS

In a case that the MTS flag is enabled (sps_mts_enabled_flag==1), and the explicit MTS flag does not indicate enabled (explicitMtsEnabled==0), the MTS configuration unit 152112 may derive trTypHor=trTypeVer=0. For example, SM000 may be performed prior to SM001 described above.

FIG. 21 is a diagram illustrating operation of the implicit MTS configuration unit 152112.

(SM000) In a case that stIdx!=0, the implicit MTS configuration unit 152112 derives trTypeHor=trTypeVer=0.

Note that, as illustrated in SM003 of FIG. 21, the implicit MTS configuration unit 152112 may derive the transform type through derivation of the default implicit MTS (SM003) described above in the case of stIdx==0. The transform type may be derived through SM001 and SM002.

According to the configuration described above, in a case that implicit MTS is enabled, and secondary transform is enabled, by using DCT2 as MTS, an effect of enhancing coding efficiency is exerted.

Third Embodiment of Implicit MTS

In a case that secondary transform is enabled (stIdx!=0), and neither MTS by the intra subpartition mode (SM001, IntraSubPartSplitType!=ISP_NO_SPLIT) nor MTS by the subblock transform (SM002, cu_sbt_flag==1) is used, the implicit MTS configuration unit 152112 need not use implicit MTS (for example, implicitMtsEnabled is set equal to 0).

Figure 22:
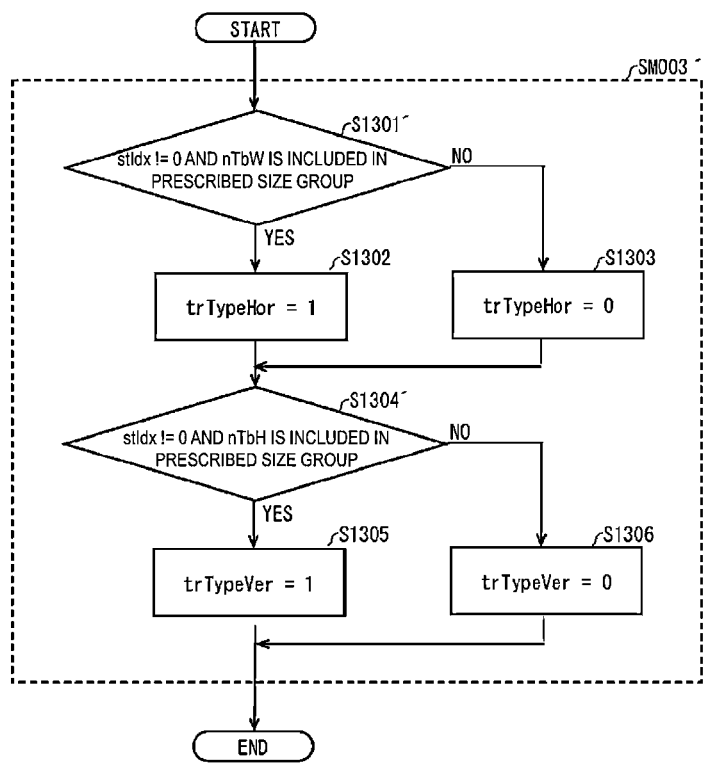
FIG. 22 is a flowchart illustrating operation of the MTS configuration unit 15211 according to the embodiment.

In a case that secondary transform is enabled (stIdx!=0), and neither MTS by the intra subpartition mode (SM001, IntraSubPartSplitType!=ISP_NO_SPLIT) nor MTS by the subblock transform (SM002, cu_sbt_flag==1) is used, trTypeHor=trTypeVer=0 is derived. For example, as illustrated in FIG. 22, SM003' may be performed instead of SM003 described above.

(SM003') Otherwise (default implicit MTS), the implicit MTS configuration unit 152112 sets the transform type tyTypeHor equal to either 0 (DCT2) or 1 (DST7), and sets the transform type tyTypeVer equal to either 0 (DCT2) or 1 (DST7) according to the secondary transform and the TU size (width nTbW, height nTbH). For example, in a case that stIdx==0 and the width nTbW is within a prescribed range (S1301'), the implicit MTS configuration unit 152112 selects 1 (DCT1) as the horizontal transform type trTypeHor (S1302), otherwise sets the horizontal transform type trTypeHor equal to 0 (DCT2) (S1303). Similarly, in a case that stIdx==0 and the height nTbH is within a prescribed range (S1304'), the vertical transform type trTypeVer is set equal to 1 (DCT1) (S1305), otherwise the vertical transform type trTypeVer is set equal to 0 (DCT2) (S1306).

$$trTypeHor =$$
$$(stIdx == 0 \;\&\&\; nTbW >= 4 \;\&\&\; <= 16 \;\&\&\; nTbW <= nTbH)?1:0$$

$$trTypeVer =$$
$$(stIdx = 0 \;\&\&\; nTbH >= 4 \;\&\&\; nTbH <= 16 \;\&\&\; nTbH <= nTbW)?1:0$$

According to the configuration described above, in a case that implicit MTS is enabled, and secondary transform is enabled, by using DCT2 as default MTS, an effect of enhancing coding efficiency is exerted.

The MTS configuration unit 15211 derives an index trType of a transform set to be used according to the following expression, and outputs the index trType to the coefficient transform processing unit 15212. The coefficient transform processing unit 15212 outputs input trType to a transform matrix derivation unit 152131. The MTS configuration unit 152111 derives a value indicating MTS to be used according to the following expression.

In a case that mts_idx==0, trTypeHor=0 trTypeVer=0
In a case that mts_idx==1, trTypeHor=1 trTypeVer=1
In a case that mts_idx==2, trTypeHor=2 trTypeVer=1
In a case that mts_idx==3, trTypeHor=1 trTypeVer=2
In a case that mts_idx==4, trTypeHor=2 trTypeVer=2

Note that the transform basis corresponding to a case that tyType (trTypeHor or trTypeVer) is 0, 1, or 2 may be DCT2, DST7, or DCT8.

The coefficient transform processing unit 15212 includes a vertical transformer 152121 that performs vertical transform on the modification transform coefficient d[ ][ ], and a horizontal transformer 152123 that performs horizontal transform thereon.

The vertical transformer 152121 (coefficient transform processing unit 15212) performs the following processing.

$$e[x][y] = \sum (transMatrix[y][j] \times d[x][j]) (j = 0 \ldots nTbS - 1)$$

Here, transMatrix[ ][ ] (=transMatrixV[ ][ ]) is a transform basis that is represented by an nTbS×nTbS matrix derived using trTypeVer. nTbS is the height nTbH of the TU. In a case of 4×4 transform (nTbS=4) of DCT2 of trType==0, for example, transMatrix={{29, 55, 74, 84}{74, 74, 0, −74}{84, −29, −74, 55}{55, −84, 74, −29}} is used. The symbol Σ signifies processing of adding the product of the matrix transMatrix[y][j] and the transform coefficient d[x][j] regarding the index j for j=0 . . . nTbS−1. In other words, e[x][y] is arrayed columns obtained from the product of a vector x[j] (j=0 nTbS−1) including d[x][j] (j=0 nTbS−1) being each column of d[x][y] and an element transMatrix[y][j] of the matrix.

An intermediate clipping unit 152122 clips an intermediate value e[ ][ ] and thereby derives an intermediate value g[ ][ ], and transmits the intermediate value to the horizontal transformer 152123.

$$g[x][y] = Clip3(coeffMin, coeffMax, (e[x][y] + 64) >> 7)$$

64 and 7 in the above expression are numerical values determined from the bit depth of the transform basis, and in the above expression, it is assumed that the transform basis is 7 bits. In addition, coeffMin and coeffMax are respectively a minimum value and a maximum value of clipping.

The horizontal transformer 152123 (coefficient transform processing unit 15212) performs the following processing. transMatrix[ ][ ] (=transMatrixH[ ][ ]) is a transform basis that is represented by an nTbS×nTbS matrix derived using trTypeHor. nTbS is the width nTbW of the TU. The horizontal transformer 152123 transforms the intermediate value g[x][y] into the prediction residual r[x][y] by means of horizontal one-dimensional transform.

$$r[x][y] = \sum transMatrix[x][j] \times g[j][y](j = 0 \ldots nTbS - 1)$$

The symbol Σ signifies processing of adding the product of the matrix transMatrix[x][j] and g[j][y] regarding the index j for j=0 nTbS−1. In other words, r[x][y] is arrayed rows obtained from the product of g[j][y] (j=0 nTbS−1) being each row of g[x][y] and the matrix transMatrix.

The prediction residual r[ ][ ] is transmitted from the horizontal transformer 152123 to the adder 312.

The vertical transformer 152121 and the horizontal transformer 152123 perform transform using the matrix transform processing unit 15213. The matrix transform processing unit 15213 includes a transform matrix derivation unit 152131 and a transform processing unit 152132.

The transform matrix derivation unit 152131 derives a transform matrix transMatrix[ ][ ] according to the length (nTbW, nTbH) of the TU and the index tyType (trTypeHor, trTypeVer) of the core transform.

The matrix transform processing unit 15213 transforms an input one-dimensional array xx[j] into a one-dimensional array yy[i] by using the derived transform matrix transMatrix[ ][ ], and performs vertical transform and horizontal transform. In the vertical transform, the transform coefficient d[x][j] in column x is input as a one-dimensional transform coefficient xx[j] and is transformed. In the horizontal transform, the intermediate coefficient g[j][y] in row y is input as xx[j] and is transformed.

$$yy[i] = \sum (transMatrix[i][j] \times xx[j]) (j = 0 \ldots nTbS - 1)$$

Secondary Transform

In a case of decoding the secondary transform stIdx, the TU decoder 3024 may constrain a range of the value of stIdx to be decoded according to whether or not the value of mts_idx is enabled.

Constraint Example 1

In a case that mts_idx is 0, the TU decoder 3024 sets the maximum value cMax of stIdx to be decoded equal to 1, and decodes stIdx=0 to 2. Otherwise, that is, in a case that mts_idx=1, 2, 3, 4, the TU decoder 3024 derives stIdx=0 without decoding stIdx from coded data.

Constraint Example 2

In a case that mts_idx is 0 . . . 1, the TU decoder 3024 sets the maximum value cMax of stIdx to be decoded equal to 1, and decodes stIdx=0 to 2. Otherwise, that is, in a case that mts_idx=2, 3, 4, the TU decoder 3024 derives stIdx=0 without decoding stIdx from coded data.

Constraint Example 3

In a case that mts_idx is 0, 1, 2, the TU decoder 3024 sets the maximum value cMax of stIdx to be decoded equal to 1, and decodes stIdx=0 to 2. Otherwise, that is, in a case that mts_idx=3, 4, the TU decoder 3024 derives stIdx=0 without decoding stIdx from coded data.

According to the configuration described above, the variable stIdx indicating a type of secondary transform is decoded only in a case that transform of a prescribed range is performed with MTS, and thus a range in which secondary transform is enabled is limited. Therefore, an effect of simplifying coding is exerted. For example, in constraint example 2, secondary transform is not performed in a case of DCT8 where the effect overlaps with secondary transform, and therefore an effect of reducing overhead due to stIdx and enhancing coding efficiency is exerted.

The addition unit 312 adds the prediction image of the block input from the prediction image generation unit 308 and the prediction error input from the inverse quantization and inverse transform processing unit 311 to each other for each pixel, and generates a decoded image of the block. The addition unit 312 stores the decoded image of the block in the reference picture memory 306, and also outputs it to the loop filter 305.

Configuration of Video Coding Apparatus

Figure 16:
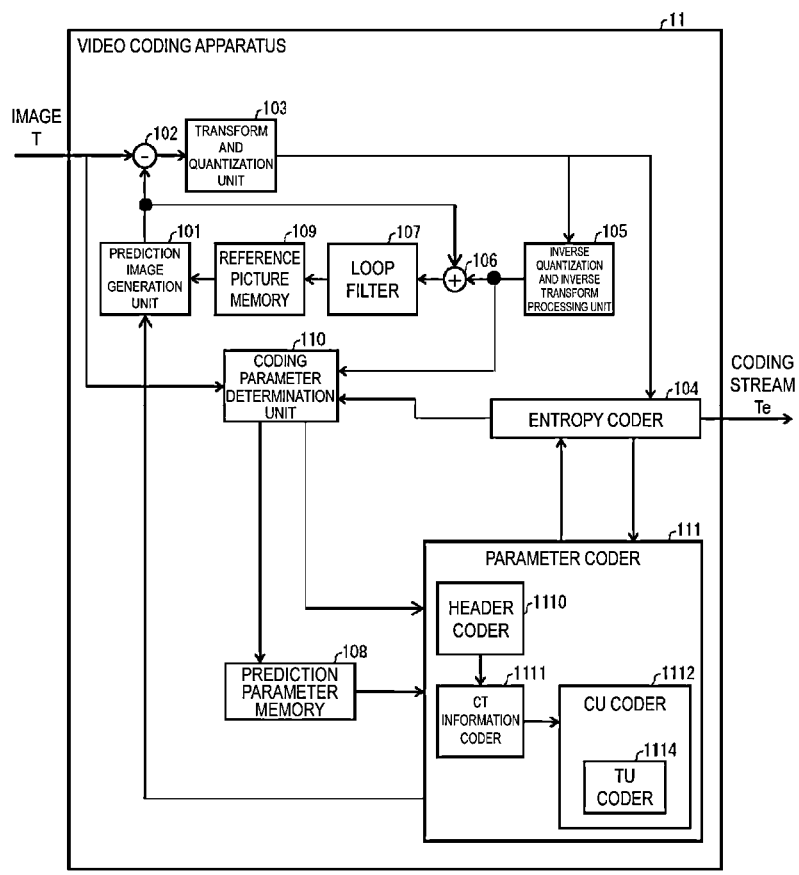
FIG. 16 is a block diagram illustrating a configuration of a video coding apparatus.

Next, a configuration of the video coding apparatus 11 according to the present embodiment will be described. FIG. 16 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (prediction parameter storage unit, frame memory) 108, a reference picture memory (reference image storage unit, frame memory) 109, a coding parameter determination unit 110, a parameter coder 111, and an entropy coder 104.

The prediction image generation unit 101 generates a prediction image for each CU that is a region obtained by splitting each picture of an image T. The operation of the prediction image generation unit 101 is the same as that of the prediction image generation unit 308 already described, and description thereof will be omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient by quantization. The transform and quantization unit 103 outputs the quantization transform coefficient to the entropy coder 104 and the inverse quantization and inverse transform processing unit 105.

As illustrated in FIG. 19, the transform and quantization unit 103 includes a forward core transform 10321 (first transformer) and a forward secondary transformer 10322 (second transformer).

In the forward secondary transform applied in the video coding apparatus 11, substantially the same processing is performed except that the processings S1 to S4 of secondary transform applied to the video decoding apparatus 31 are applied inversely in order of processings S1, S4, S3, and S2.

In the processing S1, the forward secondary transformer 10322 performs the same processing as that of the secondary transformer 31121 except that input and output of secondary transform are length nStOutSize and nonZeroSize, respectively.

In the processing S4, the forward secondary transformer 10322 derives the one-dimensional array v[ ] of nStOutSize (or nStSize*nStSize) from the transform coefficient d[ ][ ] at a prescribed position in the TU.

In the processing S3, the forward secondary transformer 10322 obtains the one-dimensional array u[ ] (vector F) of nonZeroSize from the one-dimensional array v[ ] (vector V) of nStOutSize and the transform matrix T[ ][ ] according to the following transform.

$$F = trans(T) \times V$$

Here, trans(T) is a transposed matrix of T. The secondary transformer may derive the one-dimensional array u[ ] (vector F) according to the following expression.

$$F = Tinv \times V$$

Here, Tinv is an inverse matrix of T. T includes a first type of transform basis T1 and a second type of transform basis T2. Note that the secondary transformer may transform trans(T) of T into Tinv by using an orthogonal matrix for T.

Note that, in actual processing, T is a matrix of integer values, and is not T×Tinv=I (unit matrix) but is a constant multiple of a unit matrix (T×Tinv=K2×I, K2 is a constant). In this case, the secondary transformer uses a matrix of a constant multiple of an inverse matrix as Tinv, but may use the inverse matrix as it is regarding the transposed matrix.

In the processing S2, the forward secondary transformer 10322 rearranges the one-dimensional array u[ ] of nonZeroSize into a two-dimensional array, and derives the transform coefficient d[ ][ ].

```
for (x = 0; x < nonZeroSize; x ++) {
    xC = (xSbIdx << log2StSize) + DiagScanOrder[log2StSize][log2StSize]
    [x][0]
    yC = (ySbIdx << log2StSize) + DiagScanOrder[log2StSize][log2StSize]
    [x][1]
    d[xC][yC] = u[x]
}
```

The inverse quantization and inverse transform processing unit 105 is the same as the inverse quantization and inverse transform processing unit 311 (FIG. 15) in the video decoding apparatus 31, and description thereof is omitted. The calculated prediction error is output to the addition unit 106.

To the entropy coder 104, the quantization transform coefficient is input from the transform and quantization unit 103, and a coding parameter is input from the parameter coder 111. The coding parameter is, for example, predMode.

The entropy coder 104 performs entropy coding on split information, the prediction parameter, the quantization transform coefficient, and the like, and generates and outputs the coding stream Te.

The parameter coder 111 includes a header coder 1110, a CT information coder 1111, a CU coder 1112 (prediction mode coder), an inter prediction parameter coder 112, and an intra prediction parameter coder 113 (not illustrated). The CU coder 1112 further includes a TU coder 1114.

General operation of each module will be described below. The parameter coder 111 performs coding processing of parameters such as header information, split information, prediction information, and quantization transform coefficients.

The CT information coder 1111 codes the QT or MT (BT, TT) split information or the like from the coded data.

The CU coder 1112 codes the CU information, the prediction information, the TU split flag, the CU residual flag, and the like.

In a case that a prediction error is included in the TU, the TU coder 1114 codes the QP update information (quantization correction value) and the quantization prediction error (residual_coding).

The CT information coder 1111 and the CU coder 1112 supplies the syntax elements such as the inter prediction parameter, the intra prediction parameters (intra_luma_mpm_flag, intra_luma_mpm_idx, intra_luma_mpm_remainder), and the quantization transform coefficients to the entropy coder 104.

Configuration of Intra Prediction Parameter Coder 113

The intra prediction parameter coder 113 derives a format for coding (for example, intra_luma_mpm_idx, intra_luma_mpm_remainder, and the like) from IntraPredMode input from the coding parameter determination unit 110. The intra prediction parameter coder 113 includes partially the same configuration as the configuration that the intra prediction parameter decoder 304 derives the intra prediction parameter.

Figure 17:
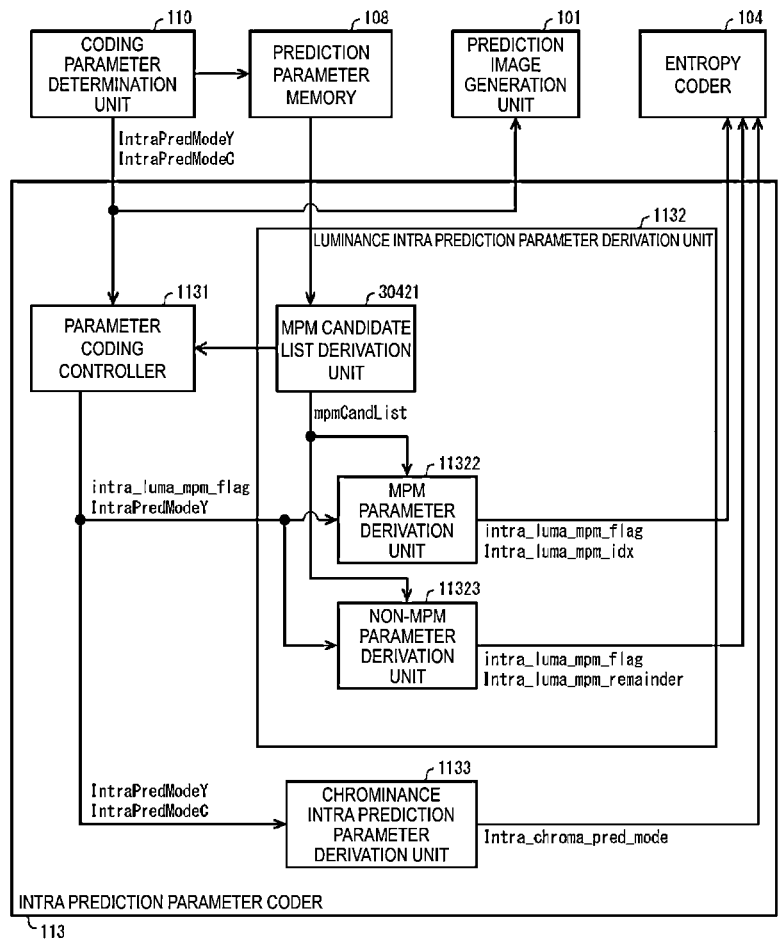
FIG. 17 is a schematic diagram illustrating a configuration of an intra prediction parameter coder.

FIG. 17 is a schematic diagram illustrating a configuration of the intra prediction parameter coder 113 of the parameter coder 111. The intra prediction parameter coder 113 includes a parameter coding controller 1131, a luminance intra prediction parameter derivation unit 1132, and a chrominance intra prediction parameter derivation unit 1133.

To the parameter coding controller 1131, IntraPredModeY and IntraPredModeC are input from the coding parameter determination unit 110. The parameter coding controller 1131 refers to mpmCandList[ ] of the MPM candidate list derivation unit 30421, and thereby determines intra_luma_mpm_flag. Then, the parameter coding controller 1131 outputs intra_luma_mpm_flag and IntraPredModeY to the luminance intra prediction parameter derivation unit 1132. The parameter coding controller 1131 outputs IntraPredModeC to the chrominance intra prediction parameter derivation unit 1133.

The luminance intra prediction parameter derivation unit 1132 includes an MPM candidate list derivation unit 30421 (candidate list derivation unit), an MPM parameter derivation unit 11322, and a non-MPM parameter derivation unit 11323 (coder, derivation unit).

The MPM candidate list derivation unit 30421 refers to the intra prediction modes of neighboring blocks stored in the prediction parameter memory 108, and derives mpmCandList[ ]. In a case that intra_luma_mpm_flag is 1, the MPM parameter derivation unit 11322 derives intra_luma_mpm_idx from IntraPredModeY and mpmCandList[ ], and outputs intra_luma_mpm_idx to the entropy coder 104. In a case that intra_luma_mpm_flag is 0, the non-MPM parameter derivation unit 11323 derives RemIntraPredMode from IntraPredModeY and mpmCandList[ ], and outputs intra_luma_mpm_remainder to the entropy coder 104.

The chrominance intra prediction parameter derivation unit 1133 derives intra_chroma_pred_mode from IntraPredModeY and IntraPredModeC, and outputs intra_chroma_pred_mode.

The addition unit 106 adds a pixel value of the prediction image of the block input from the prediction image generation unit 101 and the prediction error input from the inverse quantization and inverse transform processing unit 105 to each other for each pixel, and generates a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error. The coding parameter determination unit 110 selects a set of coding parameters of which cost value calculated is a minimum value. In this manner, the entropy coder 104 outputs a set of selected coding parameters as the coding stream Te. The coding parameter determination unit 110 stores the determined coding parameters in the prediction parameter memory 108.

Note that, some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, and the parameter coder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains the program for a short period of time, such as a communication wire that is used to transmit the program over a network such as the Internet or over a communication line such as a telephone line, and a medium that retains the program for a certain period of time, such as a volatile memory within the computer system which functions as a server or a client in a case that the program is transmitted via the communication wire. Furthermore, the aforementioned program may be configured to implement part of the functions described above, and also may be configured to be capable of implementing the functions described above in combination with a program already recorded in the computer system.

Furthermore, a part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. A circuit integration technique is not limited to the LSI, and may be implemented with a dedicated circuit or a general-purpose processor. Furthermore, in a case that advances in semiconductor technology lead to the advent of a circuit integration technology that replaces an LSI, an integrated circuit based on the circuit integration technology may be used.

The embodiment of the present invention has been described in detail above referring to the drawings, but the specific configuration is not limited to the above embodiment and various amendments can be made to a design that fall within the scope that does not depart from the gist of the present invention.

Application Examples

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

At first, referring to FIG. 2, it will be described that the above-mentioned video coding apparatus 11 and the video decoding apparatus 31 can be utilized for transmission and reception of videos.

Figure 2:
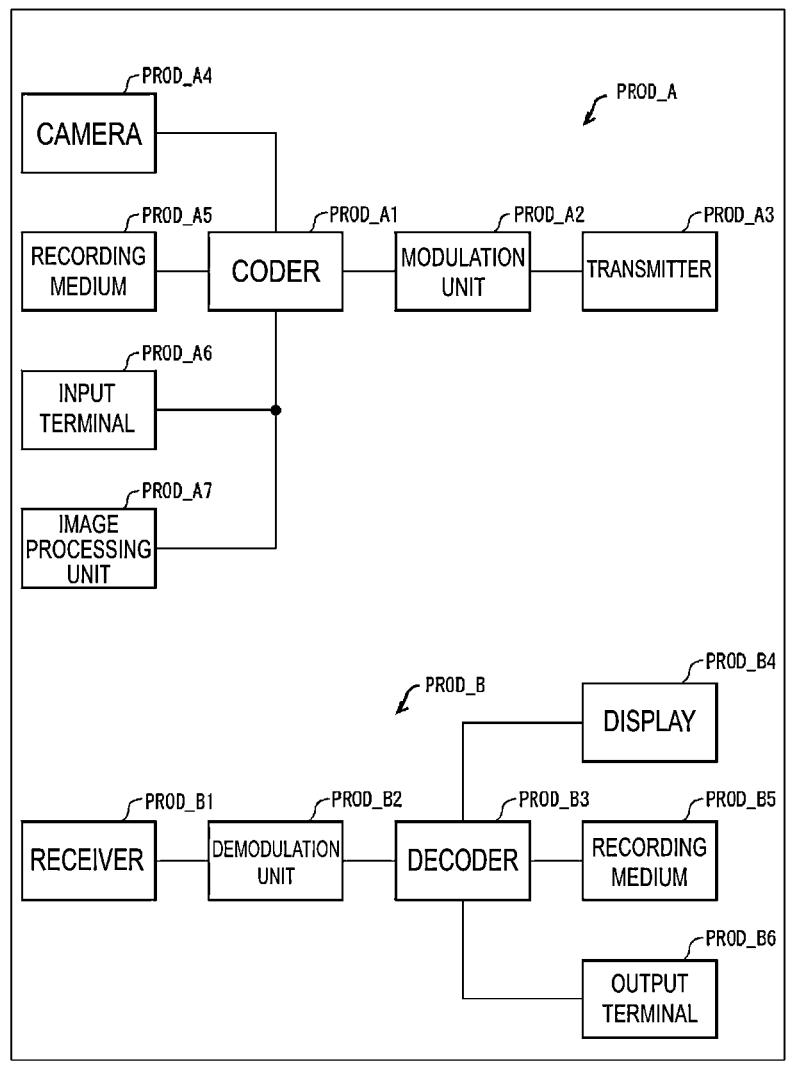
FIG. 2 is a diagram illustrating configurations of a transmitting apparatus equipped with a video coding apparatus and a receiving apparatus equipped with a video decoding apparatus according to the present embodiment. A PROD_A thereof illustrates the transmitting apparatus equipped with the video coding apparatus, and a PROD_B thereof illustrates the receiving apparatus equipped with the video decoding apparatus.

FIG. 2 illustrates a block diagram illustrating a configuration of a transmitting apparatus PROD_A installed with the video coding apparatus 11. As illustrated in FIG. 2(a), the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in the diagram, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

Furthermore, FIG. 2 illustrates a block diagram illustrating a configuration of a receiving apparatus PROD_B installed with the video decoding apparatus 31. As illustrated in the diagram, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in the diagram, some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Next, referring to FIG. 3, it will be described that the above-mentioned video coding apparatus 11 and the video decoding apparatus 31 can be utilized for recording and regeneration of videos.

Figure 3:
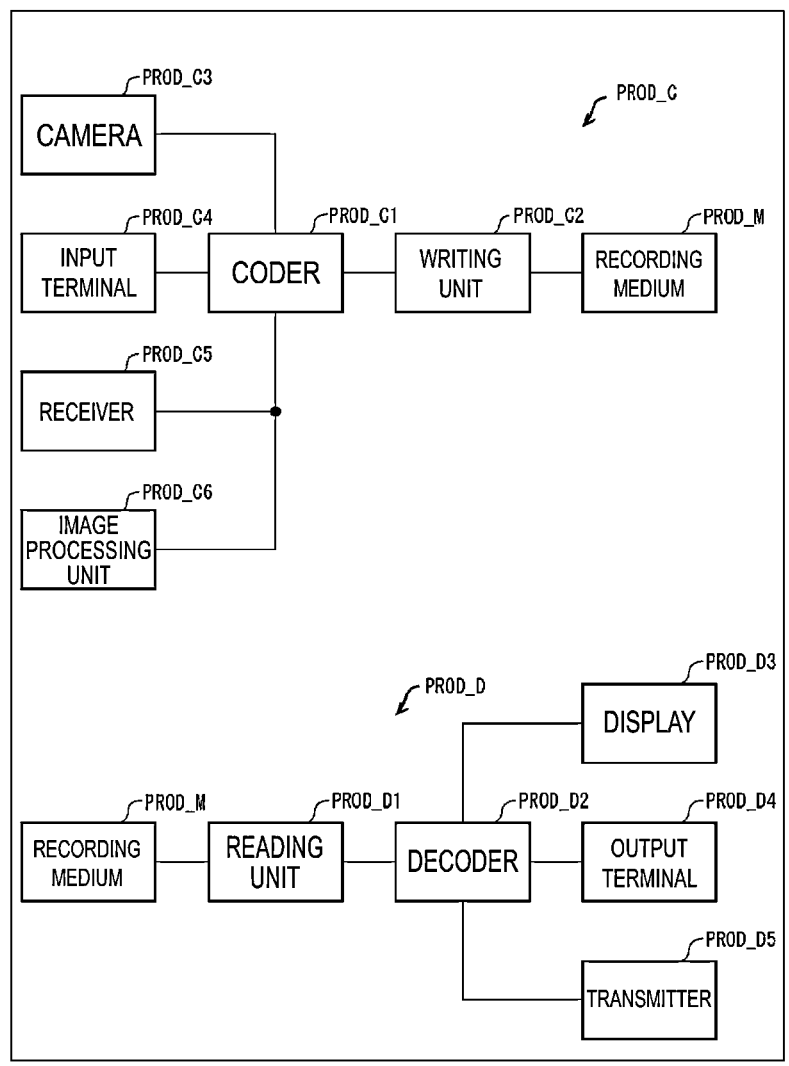
FIG. 3 is a diagram illustrating configurations of a recording apparatus equipped with the video coding apparatus and a reconstruction apparatus equipped with the video decoding apparatus according to the present embodiment. A PROD_C thereof illustrates the recording apparatus equipped with the video coding apparatus, and a PROD_D thereof illustrates the reconstruction apparatus equipped with the video decoding apparatus.

FIG. 3 illustrates a block diagram illustrating a configuration of a recording apparatus PROD_C installed with the above-mentioned video coding apparatus 11. As illustrated in FIG. 3(a), the recording apparatus PROD_C includes a coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in the diagram, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

Furthermore, FIG. 3 illustrates a block diagram illustrating a configuration of a reconstruction apparatus PROD_D installed with the above-described video decoding apparatus 31. As illustrated in the diagram, the reconstruction apparatus PROD_D includes a reading unit PROD_D1 which reads coded data written in the recording medium PROD_M, and a decoder PROD_D2 which obtains a video by decoding the coded data read by the reading unit PROD_D1. The above-described video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in the diagram, some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each of the above-described apparatuses includes a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiment of the present invention can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or an MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD: trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiment of the present invention can be also realized in the form of computer data signals embedded in a carrier such that the transmission of the program codes is embodied in electronic transmission.

The embodiment of the present invention is not limited to the above-described embodiment, and various modifications are possible within the scope of the claims. That is, an embodiment obtained by combining technical means modified appropriately within the scope defined by claims is included in the technical scope of the present invention as well.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

REFERENCE SIGNS LIST

31 Video decoding apparatus
301 Entropy decoder
302 Parameter decoder
3020 Header decoder
303 Inter prediction parameter decoder
304 Intra prediction parameter decoder
308 Prediction image generation unit
309 Inter prediction image generation unit
310 Intra prediction image generation unit
311 Inverse quantization and inverse transform processing unit
312 Addition unit
11 Video coding apparatus
101 Prediction image generation unit
102 Subtraction unit
103 Transform and quantization unit
104 Entropy coder
105 Inverse quantization and inverse transform processing unit
107 Loop filter
110 Coding parameter determination unit
111 Parameter coder
112 Inter prediction parameter coder
113 Intra prediction parameter coder
1110 Header coder
1111 CT information coder
1112 CU coder (prediction mode coder)
1114 TU coder
3111 Inverse quantization unit
3112 Inverse transform processing unit
31121 Secondary transformer
31112 Scaling unit
31123 Core transformer
10322 Forward secondary transformer
10323 Forward core transformer

The invention claimed is:

1. An image decoding apparatus for transforming a transform coefficient for each transform unit (TU), the image decoding apparatus comprising:
a decoding circuit configured to decode a secondary index indicating whether or not a secondary transform is used and a multiple transform selection (MTS) index being a switch index for selecting a transform basis of a core transform, and derive a secondary transform matrix based on the secondary index and a transform size;
a second transform circuit configured to apply the secondary transform to the transform coefficient by using the secondary transform matrix in a case that the secondary transform is enabled, and reconstruct a modification transform coefficient; and
a core transform circuit configured to apply separate transforms including a vertical transform and a horizontal transform to the transform coefficient or the modification transform coefficient, wherein
the core transform circuit includes an MTS configuration circuit and an implicit MTS configuration circuit,
the MTS configuration circuit derives a horizontal transform type variable and a vertical transform type variable according to the MTS index, in a case that an explicit MTS is enabled,
the implicit MTS configuration circuit is configured to (i) disable an implicit transform in a case that a value of the secondary index is not equal to 0, an intra subpartition mode is not used, and a subblock transform is not used, and (ii) set a value of the horizontal transform type variable equal to 1 if the value of the secondary index is equal to 0 and a width of a TU is greater than or equal to 4 and less than or equal to 16, and set a value of the vertical transform type variable equal to 1 if the value of the secondary index is equal to 0 and a height of the TU is greater than or equal to 4 and less than or equal to 16, and the core transform circuit performs the vertical transform according to the vertical transform type variable, and the horizontal transform according to the horizontal transform type variable.

\* \* \* \* \*